United States Patent [19]

Wilson et al.

[11] Patent Number: 5,624,606

[45] Date of Patent: *Apr. 29, 1997

[54] CARBONACEOUS HOST COMPOUNDS AND USE AS ANODES IN RECHARGEABLE BATTERIES

[75] Inventors: Alfred M. Wilson, Burnaby; Jeffery R. Dahn, Surrey, both of Canada

[73] Assignee: Moli Energy (1990) Limited, Canada

[*] Notice: The term of this patent shall not extend beyond the expiration date of Pat. No. 5,587,256.

[21] Appl. No.: 428,656

[22] Filed: Apr. 25, 1995

[30] Foreign Application Priority Data

May 3, 1994 [CA] Canada .................................. 2122770

[51] Int. Cl.⁶ .................................................. C01B 31/00
[52] U.S. Cl. .......................... 252/506; 252/518; 429/218; 423/447.4; 423/449.6
[58] Field of Search ........................... 429/218; 252/506, 252/518; 423/447.4, 448, 449.6

[56] References Cited

U.S. PATENT DOCUMENTS

| 5,130,211 | 7/1992 | Wilkinson et al. . |
| 5,286,582 | 2/1994 | Tahara et al. ............................ 429/218 |

FOREIGN PATENT DOCUMENTS

| 2098248 | 6/1993 | Canada . |
| 2098248 | 6/1995 | Canada . |
| 0486950A1 | 11/1991 | European Pat. Off. . |
| 582173 | 2/1994 | European Pat. Off. . |
| 615296 | 9/1994 | European Pat. Off. . |
| 3-245458 | 2/1990 | Japan . |
| 5-182668 | 4/1993 | Japan . |
| 6-96759 | 4/1994 | Japan . |

OTHER PUBLICATIONS

J.R. Dahn, et al., "Carbons and Graphites as Substitutes for the Lithium Anode", from Lithium Batteries—new Materials, Developments and Perspectives, ed. G. Pistoia, Elsevier (1990) (month N/A).

J. Yamaura, et al., "High voltage, rechargeable lithium batteries using newly–developed carbon for negative electrode material", Journal of Power Sources, 43–44(1993), pp. 233–239 (month N/A).

Y. Toyoguchi, et al., "New Negative Electrodes for Secondary Lithium Batteries", Progress in Batteries & Solar Cells, vol. 6 (1987), pp. 58–60 (month N/A).

O. Kazunori, et al., "Cycle Performance of Lithium Ion Rechargeable Battery", 10th International Seminar on Primary and Secondary Battery Technology and Application, Mar. 1–4, 1993, Deerfield Beach, Florida.

Primary Examiner—M. Nuzzolillo
Attorney, Agent, or Firm—Lerner, David, Littenberg, Krumholz & Mentlik

[57] ABSTRACT

Carbonaceous compounds and methods for preparation are described wherein the compounds comprise a pre-graphitic carbonaceous host having organized and disorganized regions and wherein atoms of other elements are incorporated in the host without changing the structure of the organized regions. A carbonaceous insertion compound with large reversible capacity for lithium can be prepared using elements capable of alloying with lithium, such as Si, as the incorporated atoms. These insertion compounds are suitable for use as high capacity anodes in lithium ion batteries.

31 Claims, 24 Drawing Sheets

| LEGEND | |
|---|---|
| CARBON IN GRAPHITIC SHEETS | ⌇ |
| INCORPORATED ATOMS | ○ |

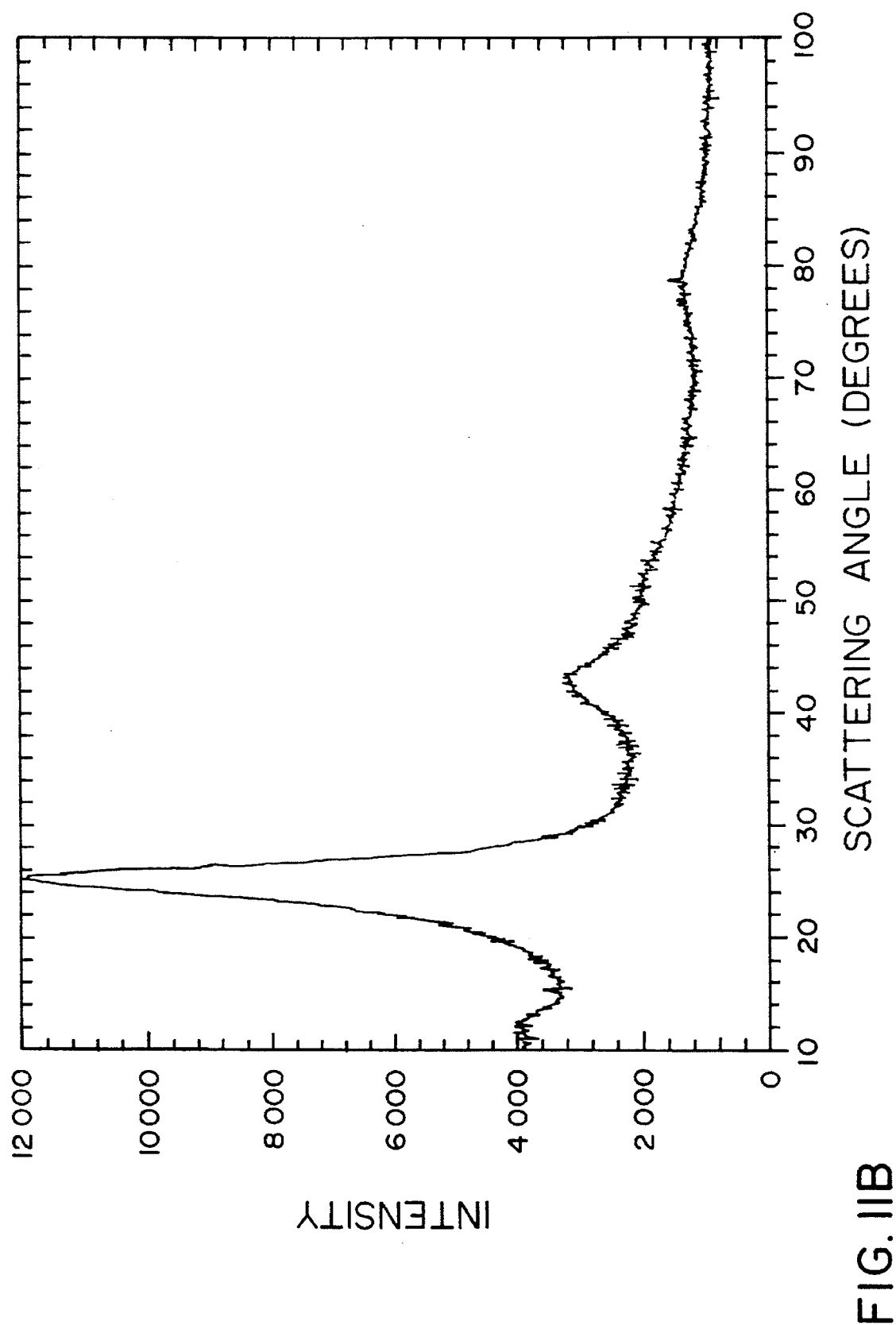
FIG. IIB

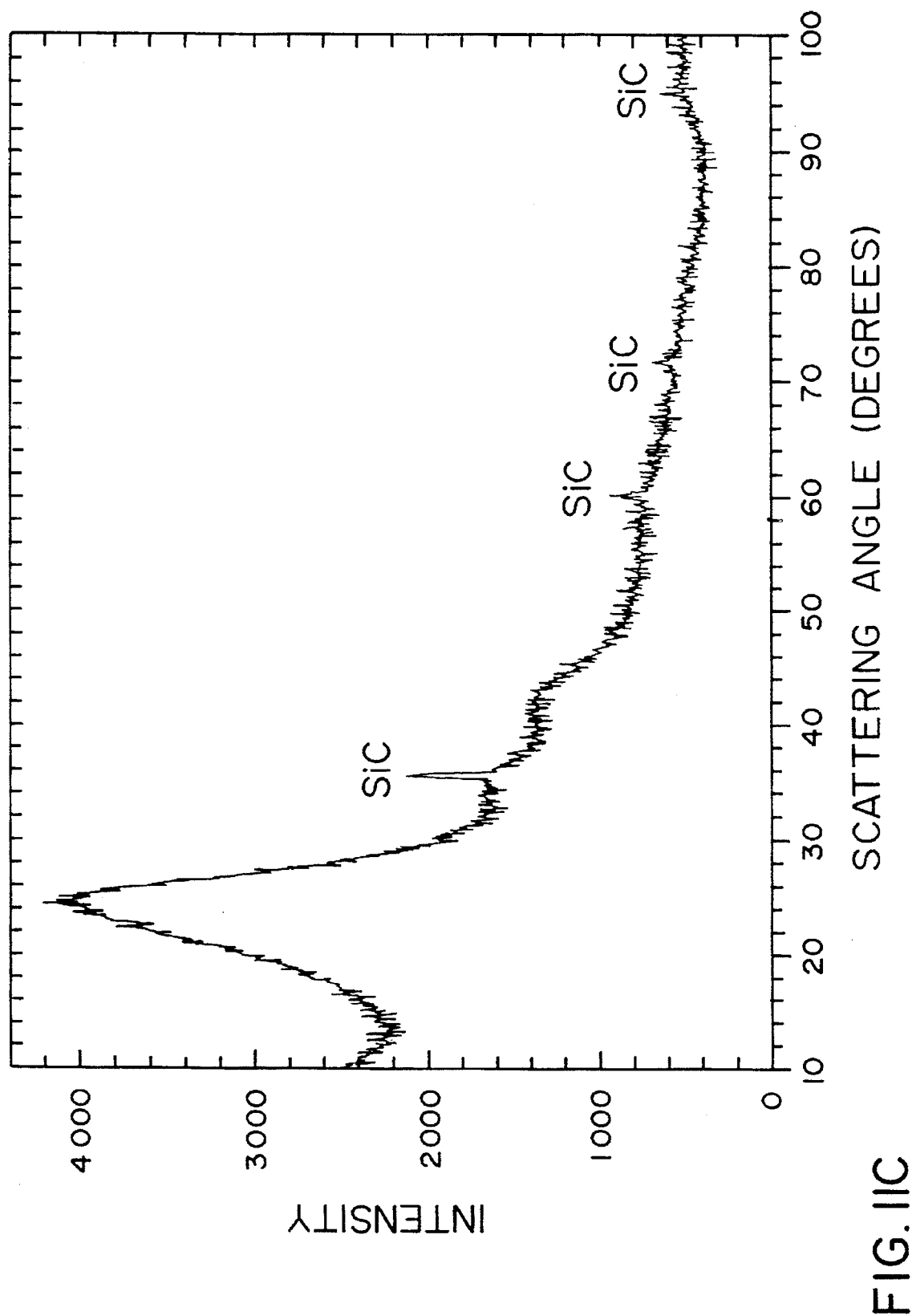
FIG. IIC

CARBONACEOUS HOST COMPOUNDS AND USE AS ANODES IN RECHARGEABLE BATTERIES

FIELD OF THE INVENTION

The invention pertains to the field of carbonaceous materials and, in particular, to pre-graphitic binary (ternary, etc.) carbonaceous materials. Additionally, the invention pertains to the field of rechargeable batteries and, in particular, to rechargeable batteries comprising carbonaceous anode materials.

BACKGROUND OF THE INVENTION

Within the enormous group consisting of carbonaceous compounds is a set where members have structures comprising parallel layers of graphene sheets. Natural graphite is an example of a member wherein the graphene sheets are stacked in a registered fashion, while coke is an example of a member wherein there are random rotations and translations in the registry of the graphene sheets. Pre-graphitic or coke-like carbon compounds are generally prepared at low temperatures (e.g.: less than about 2000° C.) since higher temperatures generally result in the annealing, hence graphitization, of the compound. There are however both hard and soft carbon compounds, the former being difficult to graphitize even at temperatures of order of 3000° C., and the latter, on the other hand, being virtually completely graphitized around 3000° C.

The aforementioned set of carbonaceous compounds has been of great interest lately for use as anode materials in what is called lithium-ion or rocking chair type batteries. These batteries represent the state of the art in small rechargeable power sources for commercial electronics applications. Typically, these batteries have about twice the energy density (Wh/L) of conventional rechargeable systems (such as NiCd or lead acid batteries). Additionally, lithium ion batteries operate around 3½ volts which is often sufficiently high such that a single cell can surface for many electronics applications.

Lithium ion batteries use two different insertion compounds for the active cathode and anode materials. Insertion compounds are those that act as a host solid for the reversible insertion of guest atoms (in this case, lithium atoms). The structure of the insertion compound nose is not significantly altered by the insertion. In a lithium ion battery, lithium is extracted from the lithium containing anode material while lithium is concurrently inserted into the cathode on discharge of the battery. The reverse processes occurs on recharge of the battery. Lithium atoms travel or "rock" from one electrode to the other as ions dissolved in a non-aqueous electrolyte with associated electrons travelling in the circuit external to the battery.

The two electrode materials for lithium ion batteries are chosen such that the chemical potential of the inserted lithium within each material differs by about 3 to 4 electron volts thus leading to a 3 or 4 volt battery. It is also important to select insertion compounds that reversibly insert lithium over a wide stoichiometry range thus leading to a high capacity battery.

A 3.6 V lithium ion battery based on a $LiCoO_2$/ pre-graphitic carbon electrochemistry is commercially available (produced by Sony Energy Tec.) wherein the carbonaceous anode can reversibly insert about 0.65 Li atom per six carbon atoms. (The pre-graphitic carbon employed is a disordered form of carbon which appears to be similar to coke.) However, the reversible capacity of lithium ion battery anodes can be increased by using a variety of alternatives mentioned in the literature. For example, the crystal structure of the carbonaceous material affects its ability to reversibly insert lithium (as described in J. R. Dahn et. al., "Lithium Batteries, New Materials and New Perspectives", edited by G. Pistoia, Elsevier North-Holland, p1–47, (1993)) . Graphite, for instance, can reversibly incorporate one lithium atom per six carbon atoms which corresponds electrochemically to 372 mAh/g. This electrochemical capacity per unit weight of material is denoted as the specific capacity for that material. Graphitized carbons and/or graphite itself can be employed under certain conditions (as for example in the presentation by Matsushita, 6th International Lithium Battery Conference, Muenster, Germany, May 13, 1992, or in U.S. Pat. No. 5,130,211).

Other alternatives for increasing the specific capacity of carbonaceous anode materials have included the addition of other elements to the carbonaceous compound. For example, European Patent Application No. EP486950 and Japanese Application Laid-Open No. 03-245458 mention the addition of small amounts of phosphorous and boron respectively to enhance the anode specific capacity. The mechanism behind this effect is unclear but it may be a result of modifications to the microstructure of the carbonaceous compound. Also, Canadian Application Serial No. 2,098,248, filed Jun. 11, 1993, discloses a means for enhancing anode capacity by substituting electron acceptors (such as boron, aluminum, and the like) for carbon atoms in the structure of the carbonaceous compound.

Historically, however, metallic lithium has been preferred as an anode material during development of rechargeable lithium batteries. Lithium metal has a specific capacity of 3.86 Ah/g, which is significantly greater than presently known alternatives. There are, however, numerous problems associated with the use of metallic lithium as an anode, most notably its poor safety record in larger battery sizes (of order of AA size or greater). The use of lithium metal anodes in rechargeable batteries has effectively been limited to very small consumer configurations (such as coin cells) or to military applications and the like.

Anode materials other than pure lithium have also been proposed and include a class of lithium alloy such as those listed in the following Table 1. Mixed alloys have also been proposed as illustrated in Y. Toyoguchi et al., Progress in Batteries and Solar Cells, 6, 58 (1987). As shown in Table 1, lithium alloys can comprise significant amounts of lithium that can be extracted and re-alloyed in principle. However, in practice, there are large volume charges associated with varying the stoichiometry of lithium in these alloys between the limits shown. These volume changes have several effects in a battery application. Firstly, the alloy anode tends to crack and fragment upon repeated alloying/extraction cycles which reduces the anode to "dust". This can result in integrity problems for the anode. Secondly, as a result of said fragmentation, the surface area of the anode increases. Since these materials are close to the chemical potential of lithium, the lithium within the alloy gets continually consumed via reaction with the battery electrolyte in the formation of passivating films on newly exposed anode surface. This reaction is undesirable since it consumes lithium irreversibly, thus resulting in overall capacity loss in a battery. Finally, an increase in surface area of a reactive anode can lead to increased sensitivity to thermal runaway, a major safety concern.

The use of carbonaceous insertion compounds as anodes has avoided the aforementioned problems with lithium alloy anodes. Since the volume changes associated with lithium insertion are small, little or no fragmentation of the carbonaceous compounds occurs. Thus, anode integrity can be maintained more easily and the anode surface area can be kept from increasing. No significant capacity loss due to further passivation film formation on fresh surfaces need occur and the thermal stability of the battery need not worsen with cycle number. Commercial batteries with carbonaceous insertion compound anodes have achieved over a thousand charge-discharge cycles without significant capacity loss and with an actual slight improvement in safety to abuse (as shown in K. Ozawa et al., The Tenth International Seminar On Primary And Secondary Battery Technology And Application, Mar. 1–4, 1993, Deerfield Beach, Fla.).

TABLE 1

LI-ALLOY ANODE MATERIALS FOR SECONDARY LI BATTERIES

| Material | Range of x | Specific Capacity mAh/g | Average Voltage versus Li (V) | Reference** |
|---|---|---|---|---|
| $Li_xSn$ | 0.4–4.5 | 902 | 0.5 | 2 |
| $Li_xAl$ | 0.0–1.0 | 992 | 0.3 | 3 |
| $Li_xSi$ | 0.0–4.2 | 4017 | 0.2 | 4 |
| $Li_xCd$ | 1.0–3.0 | 476 | 0.07 | 2 |
| $Li_xPb$ | 1.0–4.4 | 440 | 0.2 | 4 |
| $Li_xBi$ | 0.0–3.0 | 384 | 0.8 | 4 |
| $Li_xSb$ | 0.0–3.0 | 658 | 0.95 | 4 |
| $Li_xC_6$* | 0.0–1.0 | 372 | 0.1 | 1 |

*Denotes an intercalation compound for comparative purposes.
**Reference 1 is J. R. Dahn et al. in "Lithium Batteries, New Materials and New Perspectives", edited by G. Pistoia, Elsevier North-Holland, p1–47, (1993).
Reference 2 is A. Anani et al., Proceedings of the Electrochemical Society, 87-1, 382–92 (1987).
Reference 3 is J. Wang et al., Solid State Ionics, 20, 185 (1986).
Reference 4 is R. A. Huggins, Proceedings of the Electrochemical Society 87-1, 356–64 (1987).

SUMMARY OF THE INVENTION

The invention comprises pre-graphitic binary (ternary, etc.) carbonaceous compounds, processes for preparing said compounds, and use of said compounds as electrodes in electrochemical devices.

The carbonaceous compounds of the invention comprise a pre-graphitic carbonaceous host denoted C having both organized and disorganized structural regions. Atoms of at least one other element B are incorporated into the host wherein the structure of the organized regions of the host, as evidenced by x-ray diffraction measurements, is substantially unaffected by said incorporation.

The atoms of element B can be incorporated predominantly into the disorganized regions of the host. It may be expected that incorporating a significant amount of B into the disorganized regions of the host would not necessarily affect the structure of the organized regions of the host.

The atoms of element B can be incorporated predominantly as monodispersed atoms in the disorganized regions of the host wherein the term monodispersed is intended to include single atoms of element B and/or small clusters of element B that exhibit properties more characteristic of single atoms of element B than that of a bulk compound of element B.

A characteristic of the carbonaceous compound of the invention can be a substantial shift in the x-ray absorption edge for the incorporated atoms of element B with respect to the absorption edge for atoms in a pure bulk compound of element B.

Based on values achieved in the examples, it is expected that the range for y in carbonaceous compounds $B_yC_{1-y}$ of the invention may be from greater than zero up to about 0.2. Additionally, the compounds can have structural parameters a, $d_{002}$, $L_a$ and $L_c$ wherein $2.44Å<a<2.46Å$, $3.47Å<d_{002}<3.51Å$, $10Å<L_c<20Å$, and $10Å<L_a<30Å$. Finally, the element B can be Si.

Carbonaceous compounds of the invention can additionally function as insertion compounds wherein atoms of an alkali metal A are inserted into the host along with atoms of an element B that are incorporated into the host and wherein B is capable of forming alloys with metal A. (The group of alkali metals consists of the elements Li, Na, K, Rb, Cs, and Fr. The group of elements B consists of those elements capable of forming alloys with any alkali metal and thus includes but is not limited to those elements listed in Table 1.) While the incorporation of the element B does not substantially affect the structure of the organized regions of the host, the insertion of the alkali metal A may result in a significant change in said structure.

For insertion compounds of the invention, element B can be Si and/or metal A can be lithium. In such an insertion compound of formula $Li_xSi_yC_{1-y}$, y can range from zero up to about 0.11. Additionally, the midpoint of the silicon L x-ray absorption edge for the incorporated atoms of Si can be about 104 eV and the structural parameters for the insertion compound can be similar to those mentioned previously. Finally, the incorporation of atoms of element B can result in an increase in the reversible range of x in the insertion compound at voltages between about 0.15 V and about 0.6 V with respect to lithium metal.

Chemical vapour deposition can be used for making carbonaceous compounds of the invention wherein a gas phase source for host C and a gas phase source for host B are reacted together and deposited at elevated temperature. The deposition can be performed at a temperature between about 200° C. to 1100° C. to minimize graphitization in the product. The gas phase source for host C can be benzene and, in cases where element B is Si, the gas phase source for element B can be $SiCl_4$ or $Si(CH_3)_2Cl_2$.

It is expected that an alternate process for making carbonaceous compounds of the invention could involve blending a polymer source for host C and a polymer source for element B and reacting these together at elevated temperature.

Carbonaceous insertion compounds of the invention can be used as portions of electrodes in electrochemical devices, a battery being an example of such a device. A preferred application would employ the insertion compound of the invention as the anode material in a non-aqueous lithium ion battery.

DETAILED DESCRIPTION OF THE SPECIFIC EMBODIMENTS OF THE INVENTION

Figure 1:
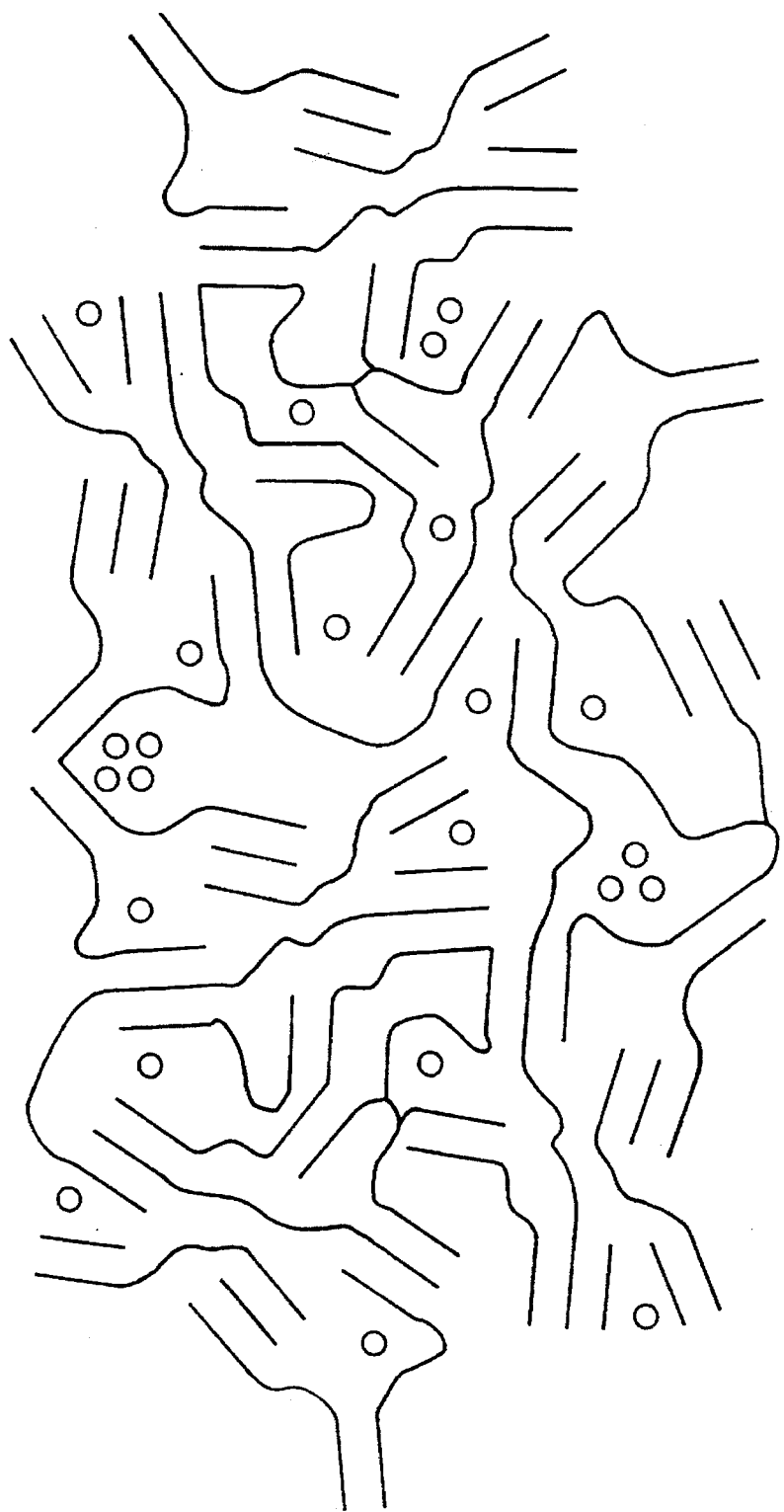
FIG. 1 depicts a schematic diagram of the structure of monodispersed atoms or clusters of atoms incorporated into disordered carbons.

The carbonaceous compounds of the invention comprise a pre-graphitic carbonaceous host having both organized and disorganized structural regions. A significant amount of at least one other element is incorporated into the host thereby changing certain of the properties of the host significantly yet without substantially affecting the structure of the host, as evidenced by x-ray diffraction measurements. Since structural information determined by x-ray diffraction methods will be dominated by the structure of the organized regions, it is the structure of the organized regions that, for the most part, must remain unaffected by the incorporation.

The compounds of the invention may exhibit characteristics or properties that are similar to those of the carbonaceous host and/or the other element. However, the compound is not simply a mixture of a carbonaceous host and a bulk compound of the other element. The presence of a bulk compound of the other element is not indicated in x-ray diffraction measurements. Additionally, the presence of a bulk compound of the other element may not be indicated based on the x-ray absorption edge energy for the incorporated atoms. Said absorption edge energy rather may indicate bonding predominantly between the incorporated atoms and the host.

Particularly useful compounds of the invention are insertion compounds wherein atoms of an alkali metal A are inserted into the host along with atoms of an element B that are incorporated into the host and wherein B is capable of forming alloys with A. When A is lithium, the compounds can be used as anode materials in lithium ion batteries, and can exhibit some of the advantages of both the carbonaceous host and the alloying element B without some of the disadvantages. (It should be noted that while the incorporation of the element B does not substantially affect the structure of the organized regions of the host, the insertion of the alkali metal A may result in a significant change in said structure.) For example, some alloying elements have higher specific capacities for lithium than do carbonaceous hosts. However, due to fragmentation resulting from repeated alloying/extraction cycles, the alloying elements do not cycle lithium as well as the carbonaceous hosts do. The insertion compounds of the invention can show both an increase in specific capacity over that of the carbonaceous host alone while still maintaining the excellent cycling capability of the host for lithium.

Based on values achieved in the examples, it is expected that the range for y in carbonaceous compounds $B_yC_{1-y}$ of the invention may be from greater than zero up to about 0.2. Additionally, the compounds can have structural parameters $a$, $d_{002}$, $L_a$ and $L_c$ wherein $2.44\text{Å} < a < 2.46\text{Å}$, $3.47\text{Å} < d_{002} < 3.51\text{Å}$, $10\text{Å} < L_a < 20\text{Å}$, and $10\text{Å} < L_a < 30\text{Å}$. The element B can be Si.

For insertion compounds of the invention, B can also be Si and/or A can be lithium. Again based on values achieved in the examples, for insertion compounds of formula $Li_xSi_yC_{1-y}$, y can range from zero up to about 0.11. Additionally, the midpoint of the silicon L x-ray absorption edge for the incorporated atoms of Si can be about 104 eV and the structural parameters for the insertion compound can be similar to those mentioned above. Finally, the incorporation of atoms of element B can result in an increase in the reversible range of x in the insertion compound at voltages between about 0.15 V and about 0.6 V with respect to lithium metal.

Without wishing to be bound by theory, adversely or otherwise, it is expected that a significant amount of the element B may be incorporated if the incorporation is predominantly in the disorganized regions of the host. Incorporation of atoms of B into these disorganized regions would not necessarily affect the structure (as determined by x-ray diffraction) of the compound significantly. The atoms of B must likely be incorporated predominantly as monodispersed atoms in the disorganized regions (illustrated schematically in FIG. 1), otherwise x-ray patterns characteristic of pure compounds of B or other compounds would be observed. (Herein the term monodispersed is intended to include single atoms of B and/or small clusters of B that exhibit properties more characteristic of single atoms of B than that of a bulk compound of B.)

Figure 2:
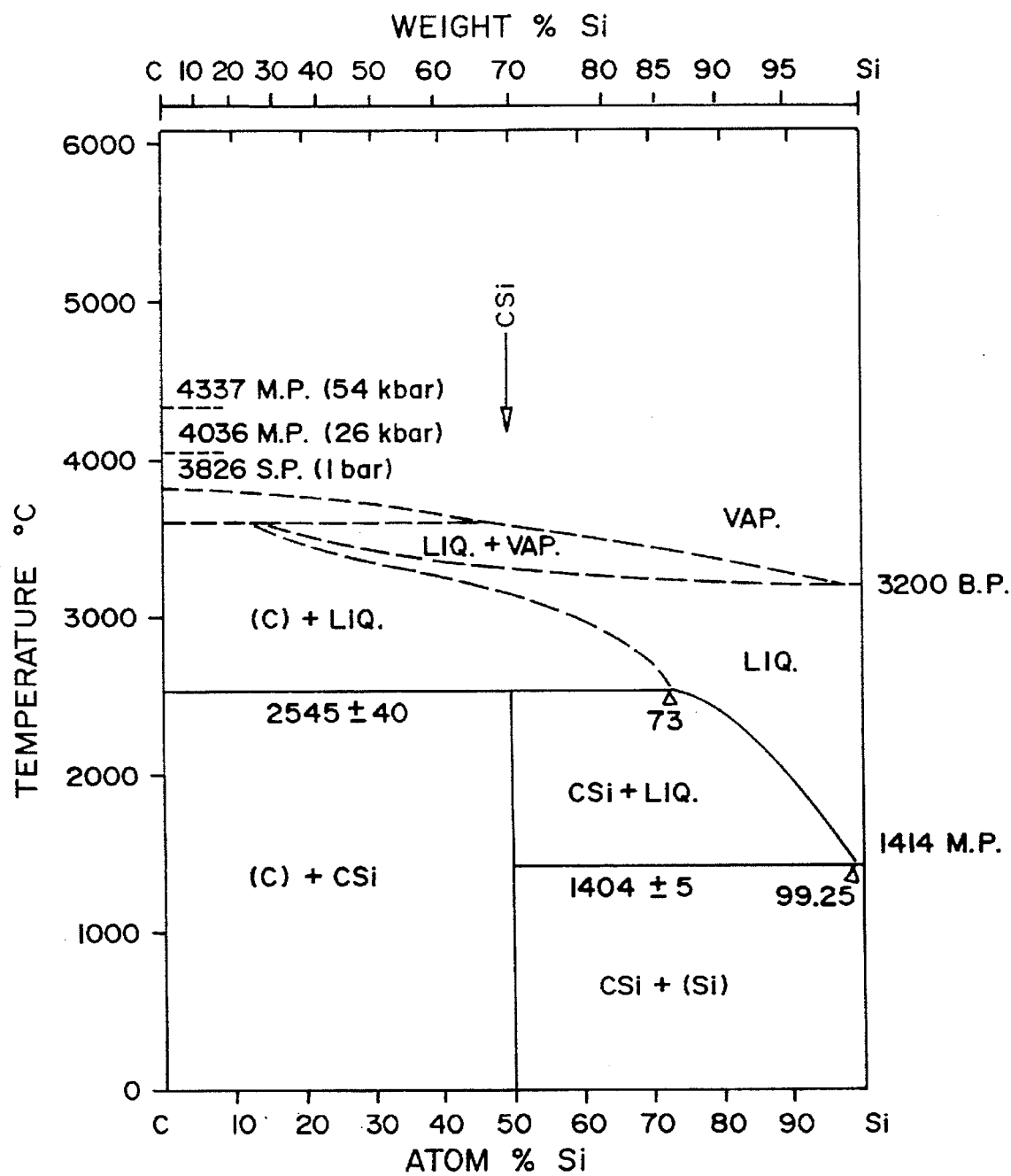
FIG. 2 shows a reproduction of the carbon-silicon equilibrium phase diagram from the literature.

For purposes of further illustration, the following discussion is provided for the specific example wherein B is Si. The Silicon-Carbon phase diagram derived from data in R. W. Olesinski and G. J. Abbaschian, Bull. Alloy Phase Diagrams 5, 486 (1984) is shown in FIG. 2. This represents the equilibrium phases which form when mixtures of the atoms are cooled from high temperatures. It is noticed that only carbon, silicon, and silicon carbide (Si-C) form equilibrium solid phases.

The compounds of the invention are predominantly carbon, with some dispersed Si atoms within, and not simply a mixture of bulk Si and C nor a mixture of large grains of SiC and C as predicted at equilibrium from the left hand side of FIG. 2. With regards to the structure as determined by x-ray diffraction methods, it is important to realize that silicon has 14 electrons per atom and carbon has only 6 electrons per atom. Since the scattered x-ray intensity from an atom is roughly proportional to the square of the number of electrons it has, the x-ray pattern should be very sensitive to the silicon. Si-C compounds of the invention have been prepared containing substantial amounts of Si yet with no evidence of crystalline Si nor SiC in the x-ray patterns. (Amorphous silicon would have been expected to crystallize at the temperatures used in the preparation.) Thus it is not clear from diffraction measurements how the Si is incorporated. R. E. Franklin, Proc. Roy. Soc. London Ser. A, 209, 196–212 shows that there is space within the disorganized regions of the carbonaceous host for single foreign atoms or small clusters to reside. FIG. 1 shows a schematic view of what the compounds of the invention could look like. It is unlikely that Si atoms are incorporated between the carbon layers in the organized regions for this would dramatically affect the spacing between the layers—an effect that is not observed in any of the examples. Furthermore, it is unlikely that the silicon atoms could be incorporated substitutionally within the carbon layers since the silicon atom is too big and silicon atoms are not found with the $sp^2$ bonding of carbon in the graphite structure. Thus the silicon atoms most likely reside as monodispersed atoms or clusters located within the disorganized regions of the host carbon.

One method for making compounds of the invention is by chemical vapor deposition (CVD) techniques. It can be desirable to use low temperature (below about 1100° C.) techniques which can, in principle, produce metastable materials. In order to get atoms of C and B (the element to be incorporated) to react at temperatures below about 1100° C., the atoms must be supplied in reactive species, for example in the gas phase. Since B and C may not be gaseous at these temperatures, suitable organic compounds are used as gas phase sources. The gas phase sources are fed into a heated reactor, where they decompose and react. This technique is called chemical vapour deposition (CVD).

Figure 3:
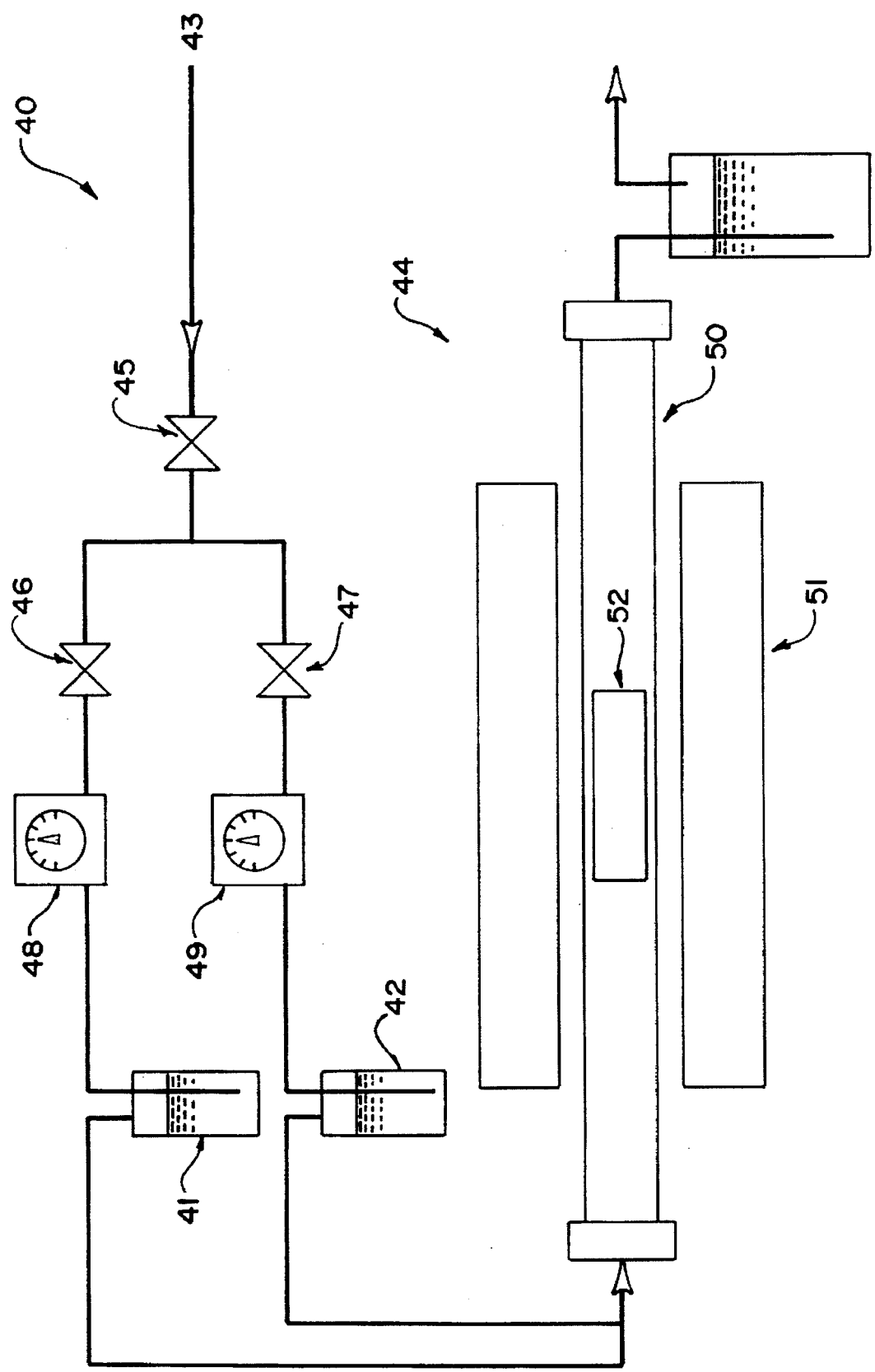
FIG. 3 depicts a diagram of the CVD system used to prepare the carbon-silicon materials of the Examples.

FIG. 3 shows a diagram of a possible laboratory scale CVD system 40 which was used to prepare the compounds in the following examples. Appropriate liquid sources of carbon (such as benzene) and, in the examples, silicon (such as $SiCl_4$ or $Si(CH_3)_2Cl_2$) are placed in Teflon™-lined stainless steel source bottles 41, 42. An inert carrier gas 43, such as ultra high purity argon, is then bubbled through these liquids. Because the liquids have appreciable vapour pressures at room temperature they are carried by the argon stream in the gas phase into the heated reactor 44. The relative ratios of the carbon and silicon sources can be adjusted by controlling the flow rates of argon through each source bottle. Mass flow controllers 45, 46, 47 and flow monitors 48, 49 are used for this purpose. The reactor 44 consists of a horizontal quartz tube 50 (51 mm diameter in this case) within a tubular furnace 51. Generally, the minimum operating temperature of such a furnace is about 200° C. Within the quartz tube 50, a smaller diameter quartz insert 52 can be placed to catch a large fraction of the deposited material. Such an insert 52 is placed in the centre of the furnace at its hottest point. Thus, deposition products, such as those prepared in the following examples, can be deposited on or in the insert 52. Typical depositions using this apparatus 40 lasted for 1 to 5 hours and produced several grams of product. The principles of operation are expected to be similar for a scaled up version of the apparatus.

Another suitable approach for synthesizing compounds of the invention may comprise blending appropriate polymers, followed by crosslinking, and then pyrolysis to drive off hydrogen, oxygen, etc. while leaving behind the carbon and silicon in the appropriate structure. For example, epoxy resins are easily crosslinked by the addition of appropriate hardeners. The number of crosslinks is controlled partly by the number of epoxy groups on the resin. The number of crosslinks affects the flexibility and hardness of the resulting crosslinked polymer and ultimately the 'hardness' of the carbon produced upon pyrolysis. (A 'hard' carbon is one that is not easily graphitized upon heating above 2000° C.) In general, the greater the number of crosslinks, the 'harder' the carbon. The nature of the disorganized and organized regions in the pyrolyzed carbon will relate to the number and distribution of crosslinks in the original blend as well as to the pyrolyzing/graphitizing temperature. The microstructures in this type of carbon may be expected to be suitable for the incorporation of atoms of other elements thereby producing compounds of the invention. Said atoms may be directly incorporated in the initial polymer blend using an appropriate source.

One specific proposal to prepare $Si_yC_{1-y}$ compounds of the invention could employ epoxy novalac resins such as DOW D.E.N. 431, 438, or 439 (tradenames), available from Dow Chemical Company, that can be crosslinked by the addition of phthallic anhydride. These novalac resins have one epoxy group per phenyl ring. The bisphenol A class of resins has an adjustable ratio of epoxy groups to phenyl groups, an example being the DOW D.E.R series of resins wherein the ratio can vary between 0 and 12. By using mixtures of novalac and bisphenol A resins, the number of crosslinks can be controlled, which in turn controls the 'hardness' of a subsequent pyrolyzed carbon product. Silicon atoms might be introduced into the initial blend in the form of silicon containing epoxy functional materials, such as the epoxy functional silane DOW Z6040 (tradename for 3-glycidoxypropyltrimethoxysilane).

A variety of battery embodiments are possible using anode material prepared by the method of the invention. Miniature laboratory batteries employing a lithium metal anode are described in the examples to follow. A preferred construction for a lithium ion type system is that depicted for a conventional spiral-wound type battery in the cross-sectional view of FIG. 4. A jelly roll 4 is created by spirally winding a cathode foil (not shown), an anode foil (not shown), and two microporous polyolefin sheets (not shown) that act as separators.

Cathode foils are prepared by applying a mixture of a suitable cathode material, such as a lithiated transition metal oxide, possibly other powdered cathode material if desired, a binder, and a conductive dilutant onto a thin aluminum foil. Typically, the application method first involves dissolving the binder in a suitable liquid carrier. Then, a slurry is prepared using this solution plus the other powdered solid components. The slurry is then coated uniformly onto the substrate foil. Afterwards, the carrier solvent is evaporated away. Often, both sides of the aluminum foil substrate are coated in this manner and subsequently the cathode foil is calendered.

Anode foils are prepared in a like manner except that a powdered carbonaceous compound of the invention is used instead of the cathode material and thin copper foil is usually used instead of aluminum. Anode foils are typically slightly wider than the cathode foils in order to ensure that anode foil is always opposite cathode foil. This feature is illustrated with the cathode upper edge 13, cathode lower edge 14, anode upper edge 12, and anode lower edge 15 depicted in FIG. 4.

Figure 4:
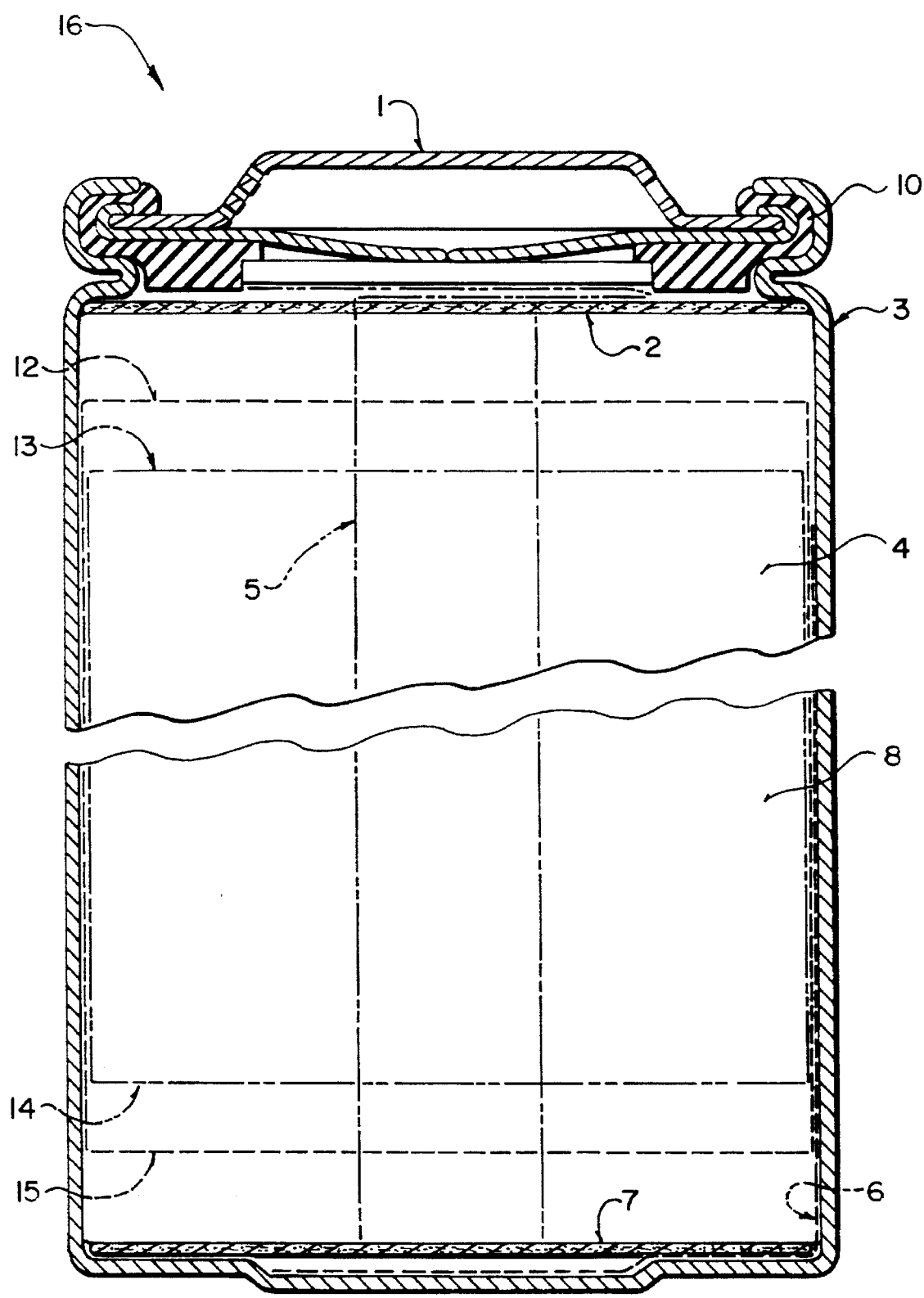
FIG. 4 depicts a cross-sectional view of a spiral-wound lithium ion type battery of conventional construction.

The jelly roll 4 is inserted into a conventional battery can 3. A header 1 and gasket 10 are used to seal the battery 16. The header may include safety devices if desired. A combination safety vent and pressure operated disconnect device may be employed. FIG. 4 shows one such combination that is described in detail in Canadian Patent Application No. 2,099,657, filed Jun. 25, 1993. Additionally, a positive thermal coefficient device (PTC) may be incorporated into the header to limit the short circuit current capability of the battery. The external surface of the header 1 is used as the positive terminal, while the external surface of the can 3 serves as the negative terminal.

Appropriate cathode tab 5 and anode tab 6 connections are made to connect the internal electrodes to the external terminals. Appropriate insulating pieces 2 and 7 may be inserted to prevent the possibility of internal shorting. Prior to crimping the header 1 to the can 3 in order to seal the battery, electrolyte 8 is added to fill the porous spaces in the jelly roll 4.

Those skilled in the art will understand that the types of and amounts of the component materials must be chosen based on component material properties and the desired performance and safety requirements of the battery. Generally an electrical conditioning step, involving at least the first recharge of the battery, is part of the assembly process. Again, the determination of an appropriate conditioning step along with the setting of the battery operating parameters (e.g. voltage, current, and temperature limits) would be required of someone familiar with the field.

Other configurations or components are possible for the batteries of the invention. For example, a prismatic format is considered highly desirable and possible. A miniature embodiment, e.g. coin cell, is also possible and the general construction of such cells is described in the laboratory coin cell examples to follow.

In the following examples, samples of carbon-silicon compounds of the invention were prepared using the aforementioned CVD apparatus and method.

Where indicated, samples were characterized by thermal gravimetric analysis (TGA) to determine silicon content using a TA instruments 951 thermal gravimetric analyzer. The carbon-silicon materials were heated in extra dry air at a rate of between 2° C./min. and 20° C./min. Upon heating to temperatures above about 700° C., the carbon reacts with air and leaves as CO and $CO_2$ while the silicon reacts to form solid $SiO_2$. The reaction is:

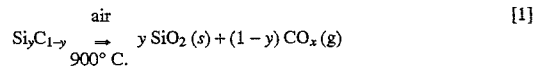

$$Si_yC_{1-y} \xrightarrow[900° C.]{air} y\,SiO_2\,(s) + (1-y)\,CO_x\,(g) \qquad [1]$$

The ratio of the final mass, $m_f$, to the initial mass, $m_i$, is $m_f/m_i = [60.1y]/[16.1y+12]$.
y, the silicon atomic content, is given by:

$$y = 12(m_f/m_i) / [60.1 - 16.1\,(m_f/m_i)]. \qquad [2]$$

The samples reported herein have values of y between greater than zero and about 0.12. The carbon-silicon powders as prepared in the CVD system are black or grey black, and the materials remaining after TGA are white, as expected for $SiO_2$ powder.

Also where indicated, powder x-ray diffraction was used to characterize the samples prepared in the CVD reactor and the materials obtained after performing TGA. A Seimens D5000 diffractometer equipped with a copper target x-ray tube and a diffracted beam monochromator was used for these experiments. The samples were made either by spreading a thin layer of powder on a "zero-background" holder (comprising a silicon wafer cut at an angle with respect to a family of lattice planes) or by filling a 2 mm deep well in a stainless steel block with powder and levelling the surface. In the former case, no spurious peaks from the holder were observed. In the latter case, the samples were sometimes loosely packed, and diffraction peaks from the stainless steel holder could be observed.

Some of the x-ray diffraction patterns were quantitatively analyzed in the following examples. Two methods of analysis were used. First, the Structure Refinement Program for Disordered Carbons developed by H. Shi et al., Journal of Applied Crystallography, 26, 827, (1993) was used to measure $d_{002}$ and $L_a$, by doing a complete refinement to the measured x-ray pattern. Next, $L_c$ and $L_a$ were estimated by using the Scherrer equation as discussed in K. Kinoshita, "Carbon, Electrochemical and Physiochemical Properties", John Wiley and Sons (1988).

$$L_c = 0.89\lambda / [B_{002} \cos(\theta)] \qquad [3]$$

where $\lambda$ is the x-ray wavelength and $B_{002}$ is the full width at half maximum of the 002 peak ($\Delta 2\theta$) in scattering angle (expressed in radians) and $\theta$ is the Bragg angle. $L_a$ is obtained by using:

$$L_a = 1.84\lambda / [B_{100} \cos(\theta)] \qquad [4]$$

Additionally, x-ray absorption measurements were performed on some samples. Soft x-ray photons incident on a solid sample can be absorbed when the x-ray energy is equal to the energy difference between a filled atomic core level and an unfilled electron energy level located above the fermi level. X-ray absorption spectroscopy (see for example A. Zangwill, "Physics at Surfaces", Cambridge University Press (1988)) measures the absorption of the sample as a function of photon energy. Typically, the absorption is small until the photon energy, $h_\nu$, becomes larger than the energy difference between the core level, $E_c$, and the Fermi level $E_f$. Once $h_\nu > E_f - E_c$, absorption can occur. A graph of absorption versus photon energy usually shows a clear 'absorption edge' located roughly at $h\nu = E_f - E_c$. A synchronous radiation source, coupled with a soft x-ray monochromator is used as the source of tunable energy soft x-rays.

The position of the x-ray absorption edge and the details of the absorption spectrum depend on the chemical environment of the absorbing atom. X-ray absorption spectroscopy can be used to distinguish between different local environments around the absorbing atom.

X-ray absorption measurements on these samples were made at the Canadian Grasshopper monochromator beamline at the Canadian Synchrotron Radiation Facility at the Synchrotron Radiation Centre, University of Wisconsin-Madison. The energy resolution at the Si l-edge is about 80 meV for the measurements described in the examples.

Figure 5:
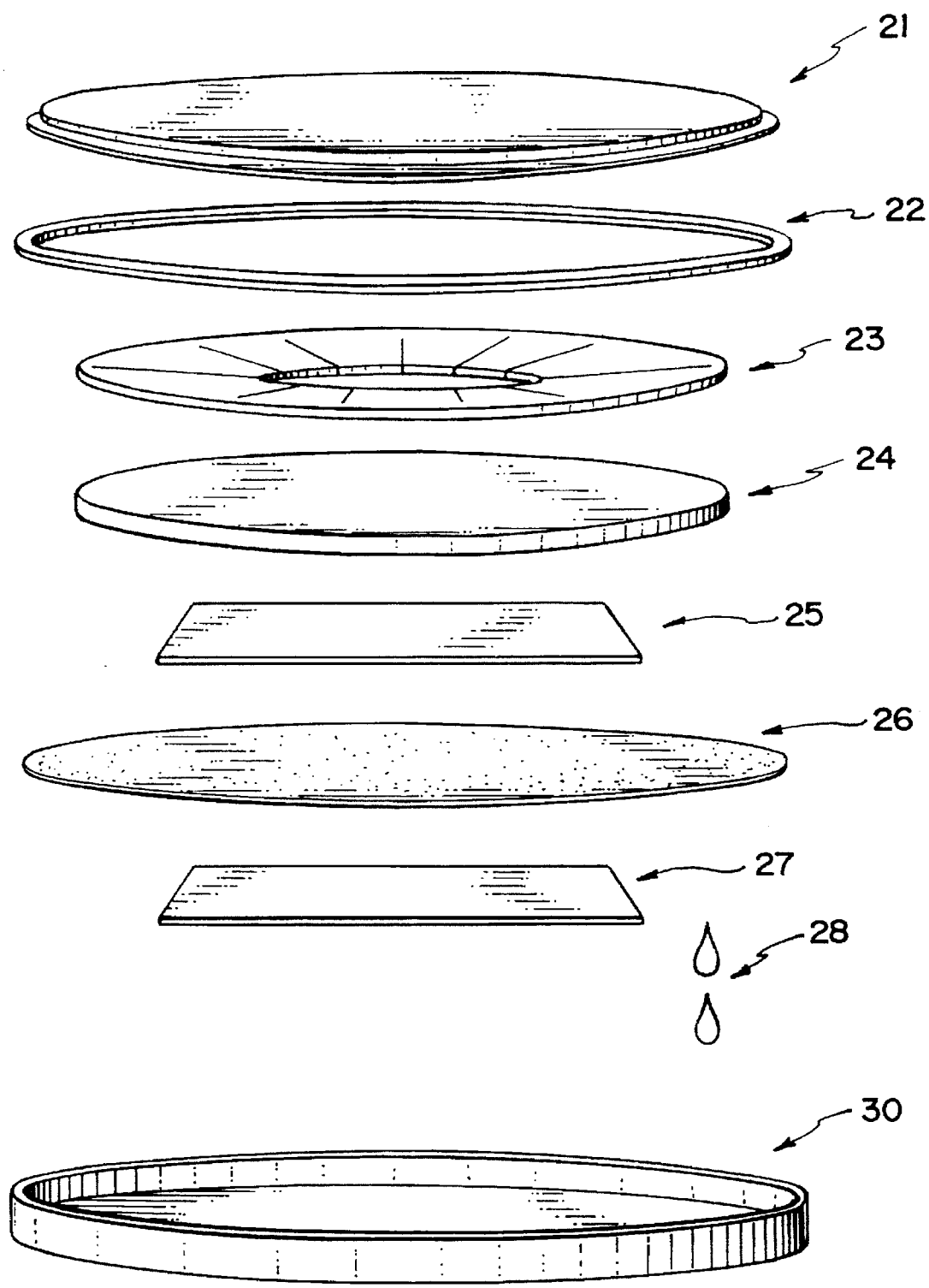
FIG. 5 depicts an exploded view of the laboratory coin cell battery used in the examples.

Laboratory coin cell batteries were used to determine electrochemical characteristics. These were assembled using conventional 2325 hardware and with assembly taking place in an argon filled glove box as described in J. R. Dahn et al, Electrochimica Acta, 38, 1179 (1993). FIG. 5 shows an exploded view of the coin cell type battery. For purposes of analysis, the samples were used as cathodes in these batteries opposite a lithium metal anode. A stainless steel cap 21 and special oxidation resistant case 30 comprise the container and also serve as negative and positive terminals respectively. A gasket 22 is used as a seal and also serves to separate the two terminals. Mechanical pressure is applied to the stack comprising lithium anode 25, separator 26, and sample cathode 27 by means of mild steel disc spring 23 and stainless disc 24. The disc spring was selected such that a pressure of about 15 bar was applied following closure of the battery. 125 μm thick metal foil was used as the lithium anode 25. Celgard® 2502 microporous polypropylene film was used as the separator 26. The electrolyte 28 was a solution of 1M $LiN(CF_3SO_2)_2$ salt dissolved in a solvent mixture of PC and EC in a volume ratio of 50/50 respectively.

Sample cathodes 27 were made using a mixture of powdered sample compound plus Super S (trademark of Ensagri) carbon black conductive diluant and polyvinylidene fluoride (PVDF) binder (in amounts of about 5% and 10% by weight to that of the sample) uniformly coated on thin copper foil. The powdered sample and the carbon black were initially added to a solution of 20% PVDF in N-methylpyrollidinone (NMP) to form a slurry such that 10% of the final electrode mass would be PVDF. Excess NMP was then added until the slurry reached a smooth syrupy viscosity. The slurry was then spread on small preweighed pieces of Cu foil (about 1.5 cm² in area) using a spreader, and the NMP was evaporated off at about 90° C. in air. Once the sample cathode stock was dried, it was compressed between flat plates at about 25 bar pressure. These electrodes were then weighed and the weight of the foil, the PVDF, and the carbon black were subtracted to obtain the active electrode mass.

After construction, the coin cell batteries were removed from the glove box, thermostatted at 30±1° C., and then charged and discharged using constant current cyclers with ±1% current stability. Data was logged whenever the cell voltage changed by more than 0.005 V. Currents were adjusted to be 3.7 mA/gram, 7.4 mA/g, 37 mA/g or 74 mA/g of active material, depending on the desired test.

COMPARATIVE EXAMPLE 1

Figure 6:
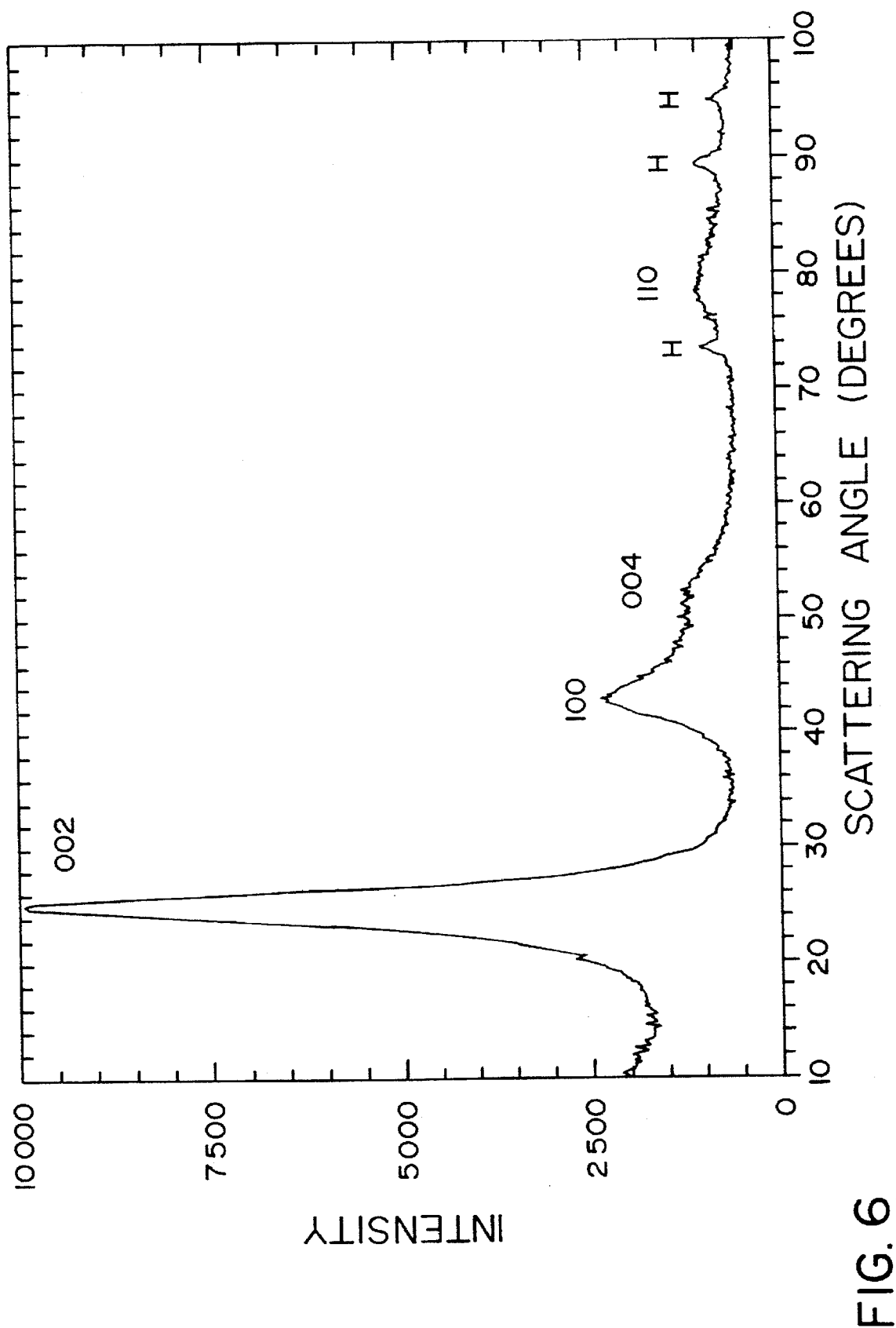
FIG. 6 depicts the x-ray diffraction pattern for sample I of Comparative Example I. Peaks from the stainless steel holder are indicated with an H. Peaks from the carbon are indicated by their Miller indices.

A sample, denoted I, was prepared by flowing only a carbon source into the CVD reactor described previously. Benzene was carried by an argon flow into the reactor heated to 950° C. The powder deposited in the insert was recovered. FIG. 6 shows the x-ray diffraction pattern for this material, which is typical of a soft carbon prepared at this temperature (see aforementioned reference of H. Shi et al.). The Miller indices of the Bragg Peaks (for definitions see B. D. Cullity, "Elements of X-ray Diffraction", Addison-Wesley) are also shown as are peaks due to the stainless steel holder which are marked H for holder. The material was heated in the TGA apparatus under air and the results are given by curve a) in FIG. 7. The sample was completely vaporized after reacting to 950° C.

COMPARATIVE EXAMPLE 2

Figure 8:
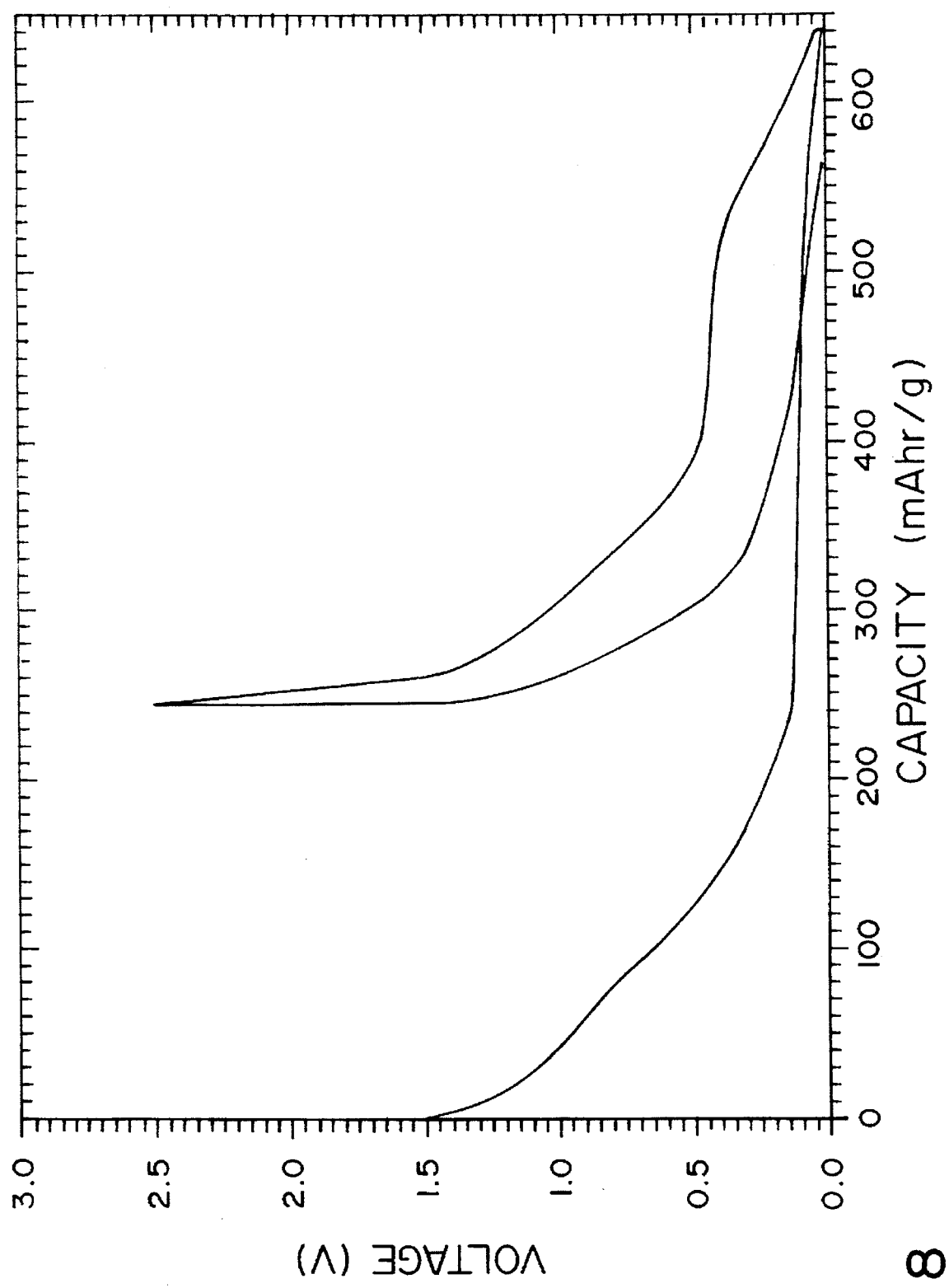
FIG. 8 shows the first discharge, first recharge, and next discharge voltage curves for the coin cell battery of Comparative Example 2.
Figure 9:
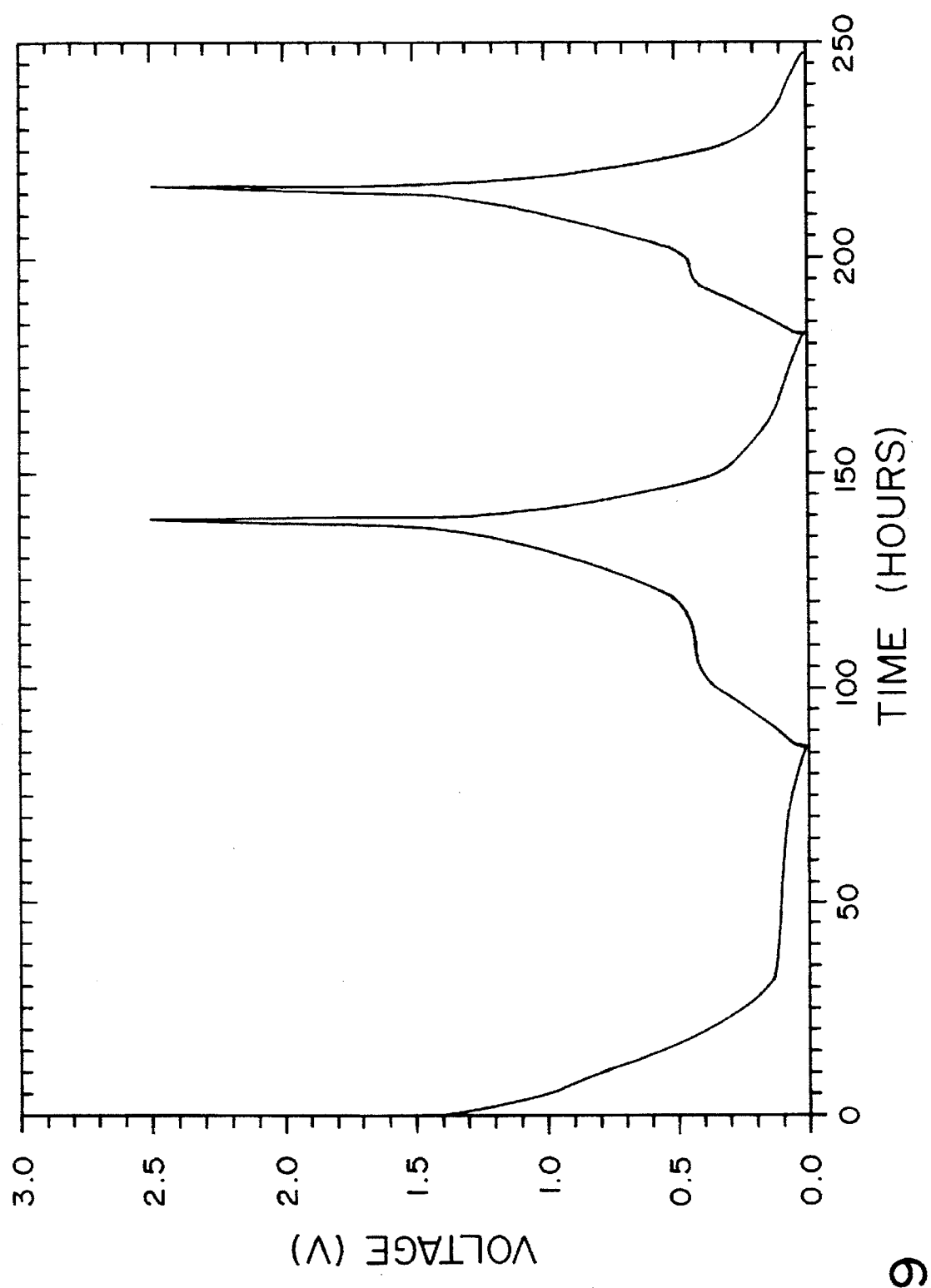
FIG. 9 shows the voltage versus time for the initial cycles of the battery of Comparative Example 2.
Figure 10:
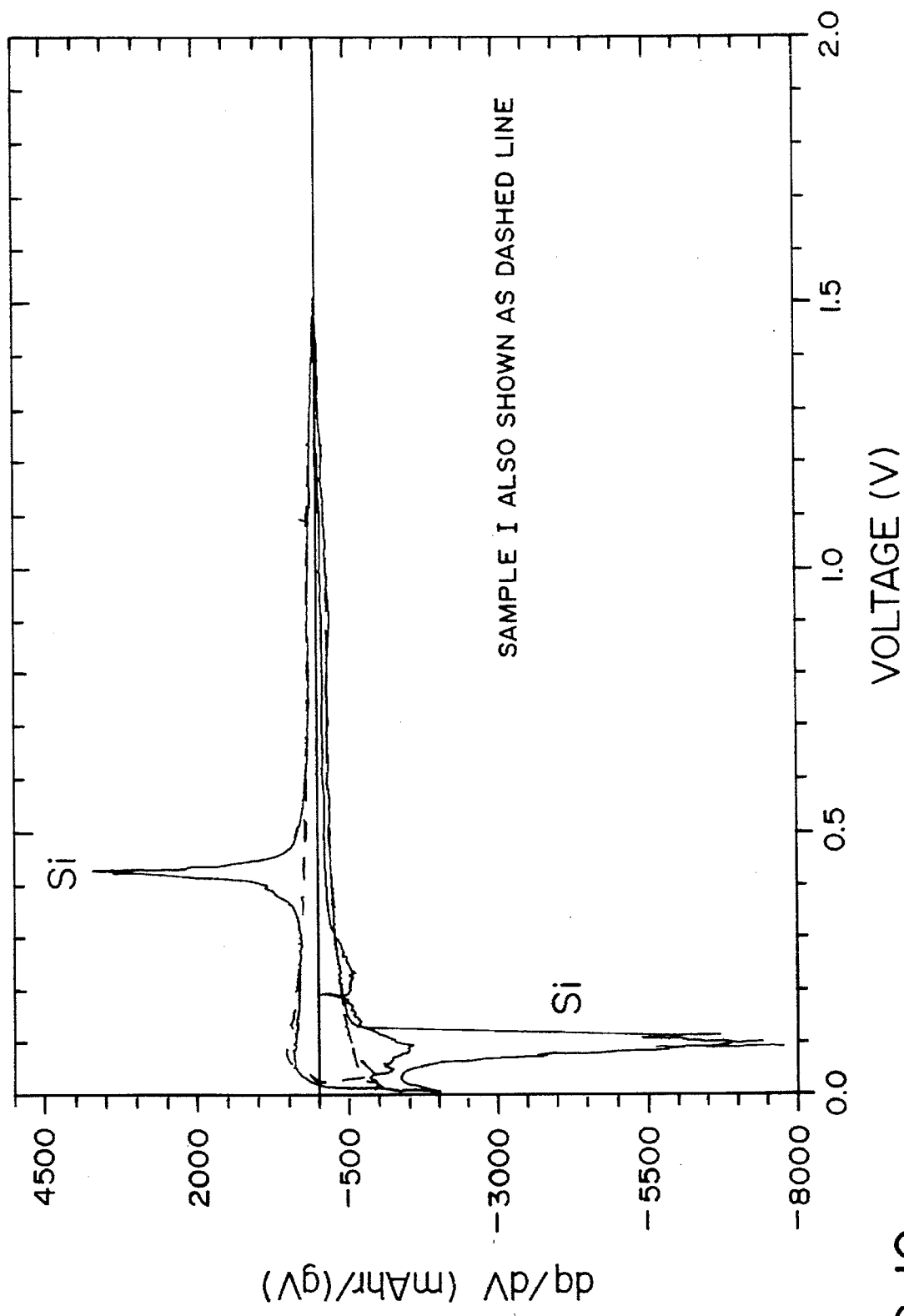
FIG. 10 shows the differential capacity versus voltage for the first two discharges and first charge of the battery of Comparative Example 2. Also shown is the differential capacity for the battery comprising sample I prepared in Inventive Example 1 (dashed line).

10% by weight of finely ground pure silicon powder plus 90% by weight of the carbon sample I of Comparative Example 1 was used to fabricate a cathode for coin cell battery testing as described previously (i.e. with added carbon black and binder). FIG. 8 shows the first discharge, first recharge and next discharge of a coin cell battery made with this sample cathode and cycled at currents of 7.4 mA/g. The initial discharge capacity is near 640 mAh/g with about 340 mAh/g from the silicon and 300 mAh/g from the carbon. The effect of the silicon is clearly evident in the first discharge as the long plateau near 0.25 V in FIG. 8. By the next discharge cycle, the silicon plateau is vastly reduced. FIG. 9 shows the battery voltage plotted versus time for the first few constant current cycles. The time taken for a discharge cycle decreases rapidly with cycle number as the battery loses the capacity due to the silicon. FIG. 10 shows the differential capacity, dq/dV, (charge stored per gram per unit voltage interval) plotted versus voltage for the first two discharges and the first charge of the same battery. The features in dq/dV associated with the silicon are indicated. Also shown on this figure by the dashed curve is dq/dV for a cell containing only sample I.

This example shows that physical mixtures of pure silicon and pure carbon (prepared using a similar CVD method to that of the invention) do not cycle well in non-aqueous lithium batteries.

INVENTIVE EXAMPLE 1

Several samples were prepared using the method of the invention. The first of these samples, denoted II, was prepared by reacting benzene and $SiCl_4$ at 1050° C. using the CVD apparatus and methods described in the preceding. The argon flow rates through each of the source bottles (which were at room temperature) were maintained at a ratio of 20.2 for the $SiCl_4$ rate to 74.0 for the benzene rate. The sample powder was collected from the insert once the deposition had completed. The other samples made, denoted III and IV, were prepared by reacting benzene and $Si(CH_3)_2Cl_2$ at 950° C. The argon flow rates through the source bottles maintained at room temperature were in a 1:1 ratio in this case. Both samples were recovered from the insert but they had quite different visual and textural properties and could thus be distinguished and separated. Sample III was black soft porous deposit which could be easily reduced to a powder. Sample IV was a grey brittle deposit which "crunched" when reduced to a powder by grinding.

Figure 11A:
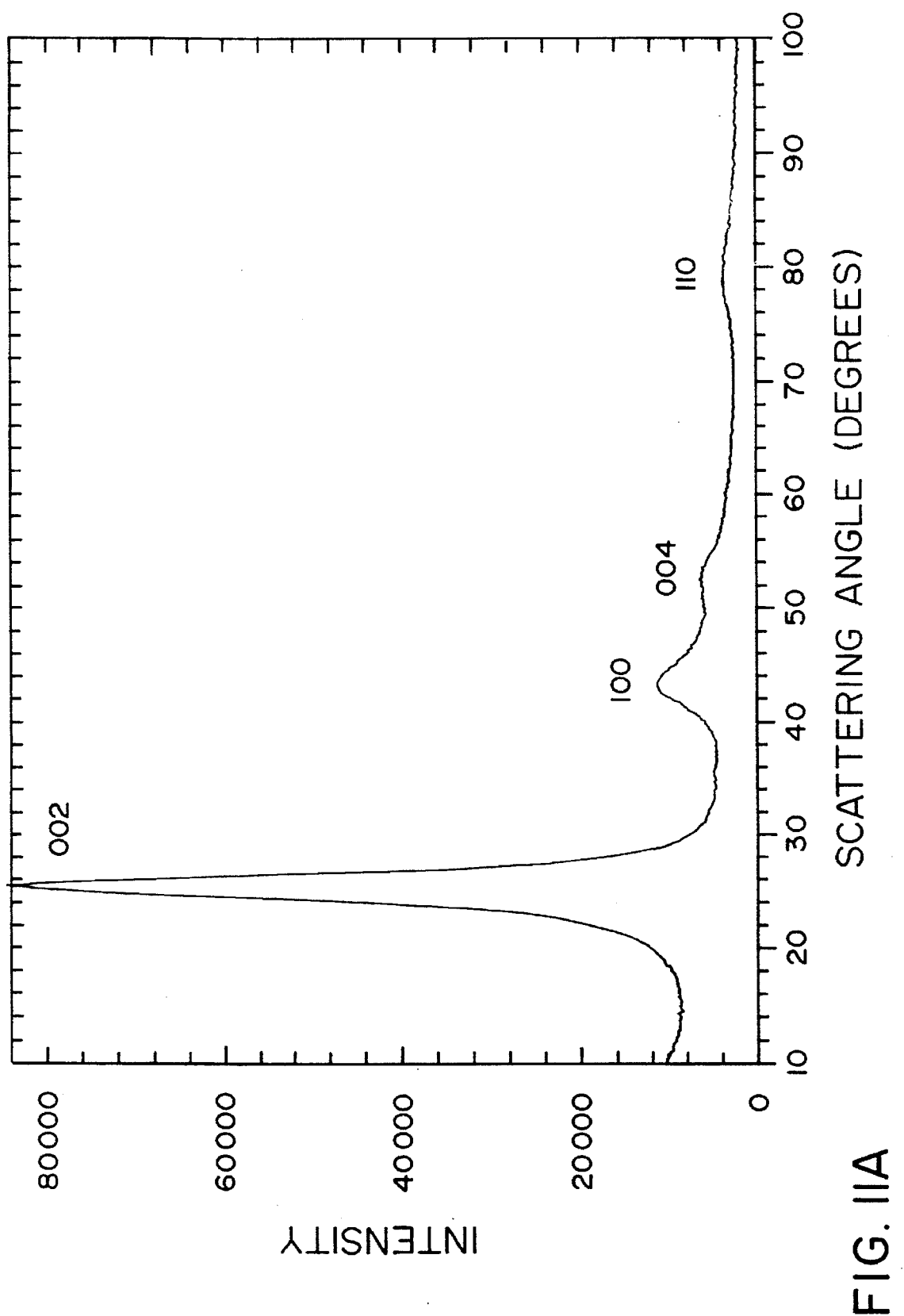
FIGS. 11a, b, and c depict the x-ray diffraction patterns for samples II, III, and IV of Inventive Example 1 respectively. Peaks from the small amount of SiC present are indicated as SiC.

FIGS. 11a, b, c show the powder x-ray diffraction pattern of samples II, III, and IV respectively. The x-ray pattern of sample II is almost identical to that of sample I of Comparative Example 1. Additionally, sample III appears to be a carbon and shows no evidence of any diffraction features due to silicon or silicon carbide, while sample IV shows small features which may be attributed to a small amount of silicon carbide.

The diffraction patterns of the samples of this Example and that of Comparative Example 1 were analyzed as outlined previously. Table 2 shows the results of this analysis along with the raw data. (In this table, the position of the maximum height of the peak was used to determine 2θ.

Additionally, the peak width, Δ2θ, represents the full width of the peak at half maximum.)

TABLE 2

Structural Information for Samples I, II, III, and IV

| Sample | 2θ (002) in deg. | Δ2θ (002) in deg. | 2θ (100) in deg. | Δ2θ (100) in deg. | $d_{002}$ in Å | La in Å by Progr am | Lc in Å by [4] | Lc in Å by [3] | measured how |
|---|---|---|---|---|---|---|---|---|---|
| I   | 25.1 | 3.4 | 42.8 | 5.4 | 3.51 | 17 | 27 | 27 | 2 mm well |
| II  | 25.6 | 2.6 | 43.2 | 5.2 | 3.47 | 18 | 33 | 30 | 0.2 mm on ZBH |
| III | 25.3 | 3.7 | 42.8 | 5.5 | 3.49 | 13 | 31 | 25 | 2 mm well |
| IV  | 24.7 | 7.2 | 43.0 | 5.0 | 3.49 | NA | 34 | 12 | 0.2 mm on ZBH |

The following must be considered with regards to interpreting the results of Table 2. Samples I and II were measured in deep well holders while Samples II and IV were measured as thin samples on zero background holders (ZBH). Carbon is a weak x-ray absorber, so the x-ray beam penetrates into the sample, causing a shift of the diffraction peaks to lower angle because the effective sample position is below the goniometer axis for samples in deep wells. The aforementioned x-ray refinement software corrects for these effects and a true value of $d_{002}$ is obtained. Sample IV has a (002) peak which is shifted significantly to lower angle compared to the others, yet gives the same $d_{002}$. This occurs since the peak width of sample IV is much larger than that of the other samples. As explained in the aforementioned reference of H. Shi et al., the intensity of a powder pattern is made up of the product of the structure factor, the atomic scattering factor and the Lorentz polarization factor. The latter two functions decrease rapidly with scattering angle, so when a broad peak in the structure factor is multiplied by the latter two functions, its peak shifts to smaller angle. Therefore two materials with exactly the same $d_{002}$ can have 002 powder peaks in different locations if one peak is narrow and the other is broad. It is our experience that these effects need to be taken into account when the peak width is greater than about 2°. The aforementioned structure refinement program takes these effects into account. Finally, the width of the peaks is increased by about 0.250° for thick samples, because the sample focus is spread over a few millimetres. This is again taken into account by the refinement program.

An examination of $d_{002}$ for the four samples shows them to be almost the same. This is the spacing between carbons plane in the organized regions which has not been affected by the addition of Si. The width of the (002) peak measures the size of the organized regions and this is seen to be weakly dependent on silicon content except for sample IV which has the most silicon. Thus, the silicon affects the size of the organized regions, but is not located within them. This is borne out by an examination of $L_a$ and $L_c$ as well. The a-axis for the four samples is 2.45±0.01Å, again showing that the addition of silicon does not affect the organized regions.

Figure 12:
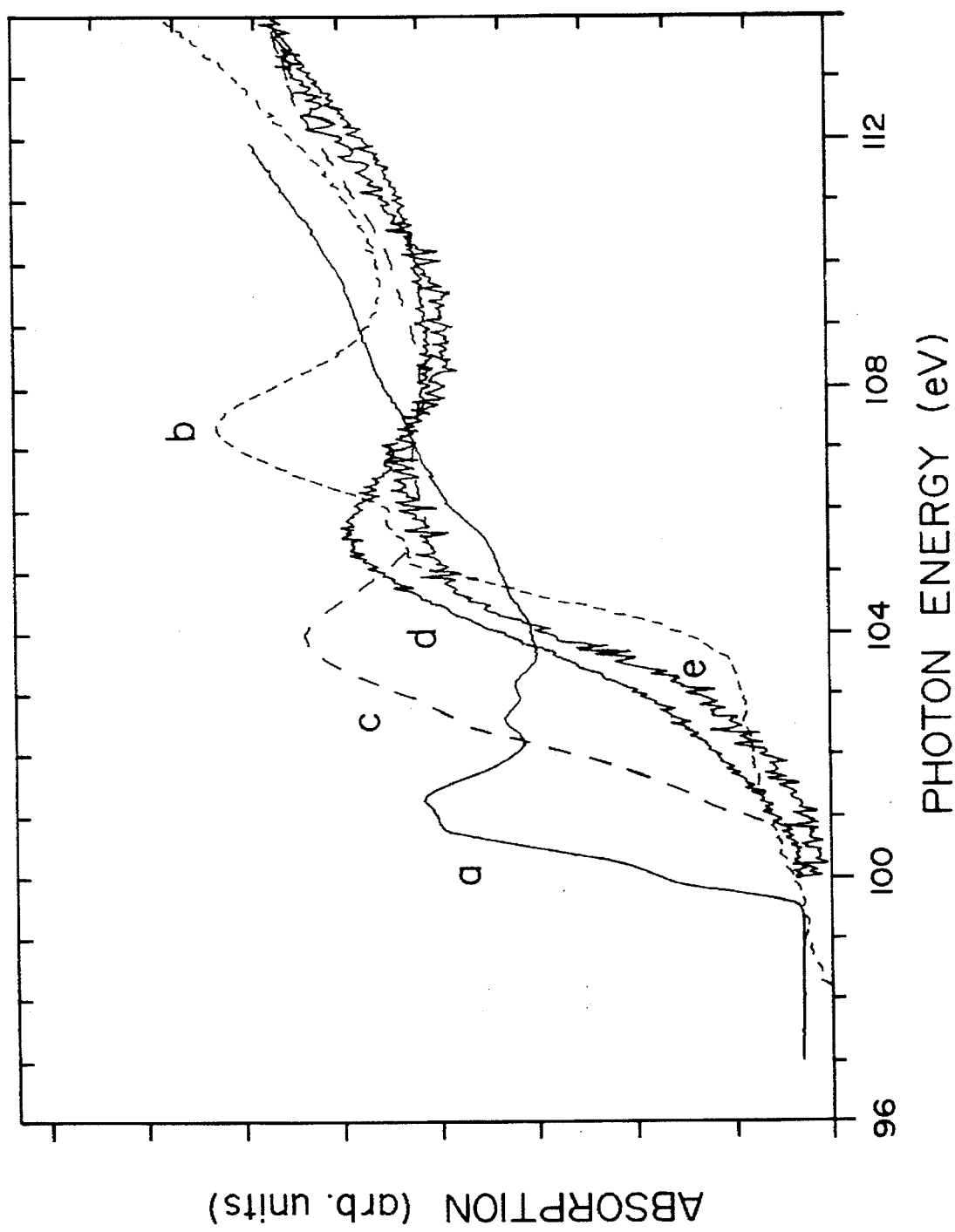
FIG. 12 depicts the x-ray absorption spectra for the materials analyzed in Inventive Example 1.

X-ray absorption spectra were obtained, in the manner mentioned before, for five silicon-containing materials and are depicted in FIG. 12. Shown are spectra for crystalline silicon (a), amorphous silica or $SiO_2$ (b), silicon carbide or SiC (c), and samples III (d) and IV (e). Amorphous silicon has an x-ray absorption edge which resembles that of crystalline silicon and occurs at the same location (see F. C. Brown et al., Phys. Rev. B15, 4781 (1977). The position of the edge depends on the value of $E_c$ as was stated before.

The core level position depends on the local chemical environment. When the silicon is surrounded by an effective electron acceptor like oxygen, which withdraws electrons from the silicon, the x-ray absorption edge shifts to higher energy. The silicon carbide result shows that carbon acts as an acceptor too. In samples III and IV, where there is more carbon per silicon than in SiC, it is expected that the silicon edge would be at higher energy than that for SiC, as observed. Without being bound by the preceding theoretical comments, it is clear that samples III and IV are not the same as silicon, SiC, or $SiO_2$. Furthermore, if samples III and IV were comprised of large regions (> about 20Å) of amorphous silicon mixed with carbon, it would expected that the absorption spectrum for the silicon edge would resemble that of amorphous Si. Thus, these materials may be considered as comprising monodispersed Si atoms in carbon. There could be small clusters as well, containing a few atoms, all of which presumably have some carbon neighbours. Coupled with the x-ray diffraction results presented above, it appears that the silicon resides in the unorganized regions of the carbon.

Figure 7:
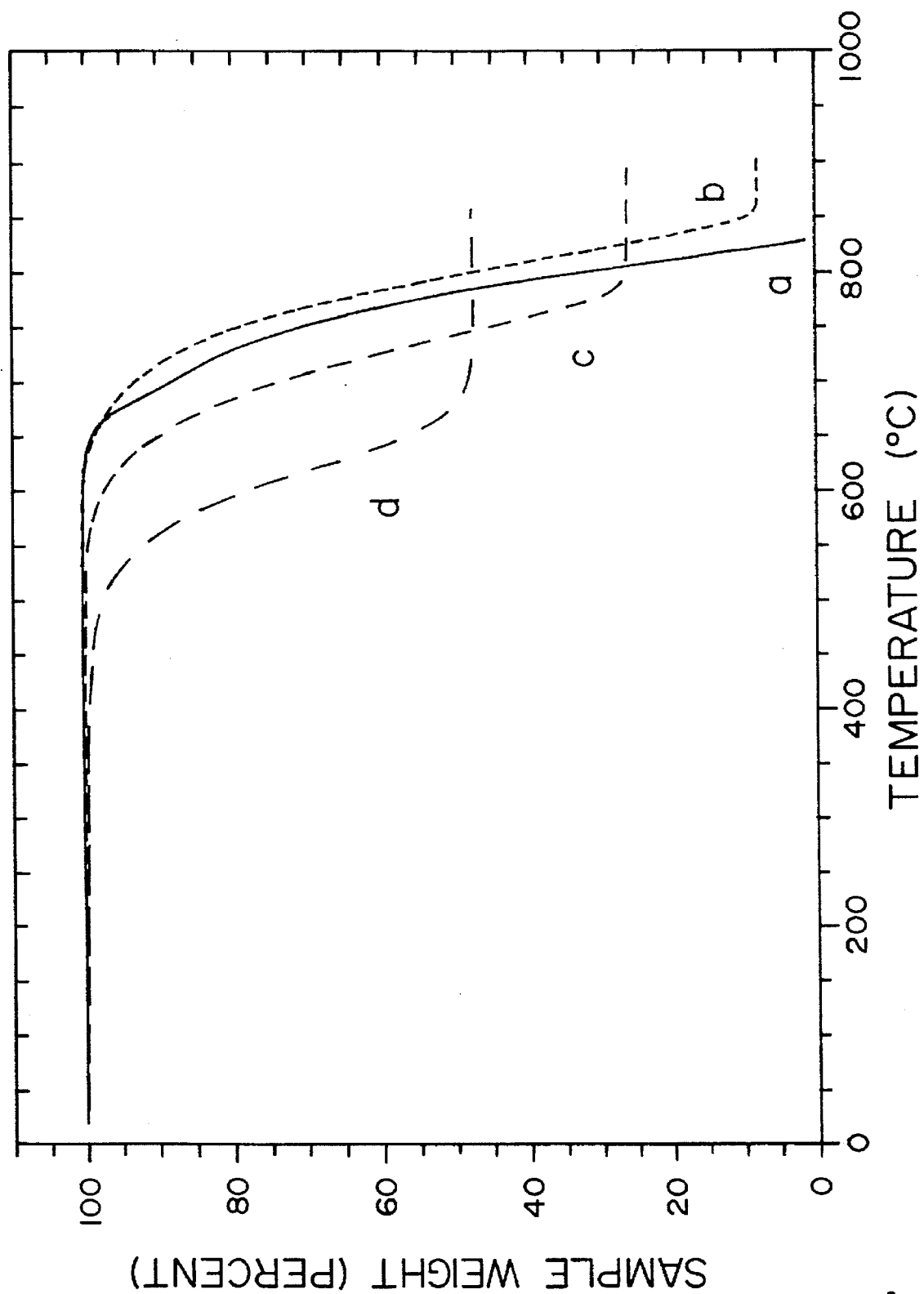
FIG. 7 depicts the TGA measurements under air as curves a), b), c), and d) for samples I, II, III, and IV of the examples respectively.
Figure 13:
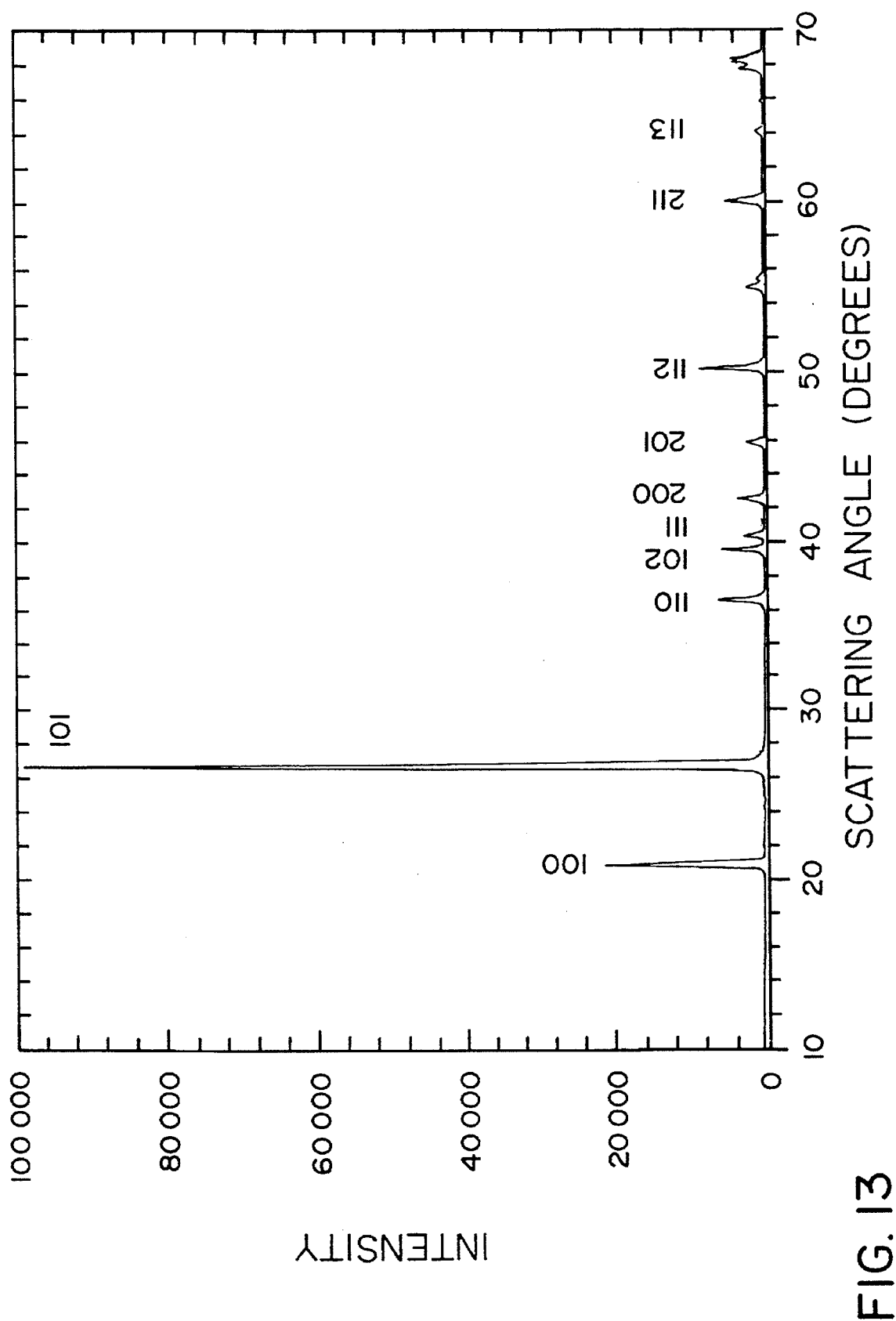
FIG. 13 depicts the x-ray diffraction pattern for sample III after heating to 950° C. in air. The Miller indices indicated are those of hexagonal quartz.

TGA results were also obtained for the samples of this example. FIG. 7 also shows the TGA results for samples II, III, and IV as curves b), c), and d) respectively. After the TGA measurements, the remnants from samples II and III were white in colour and were determined to be $SiO_2$, based on the x-ray diffraction patterns. FIG. 13 shows the pattern for the remnant of sample III in which each diffraction peak can be indexed exactly according to the published diffraction data for hexagonal quartz (JCPDS card #33-1161). The silicon content in all these samples was determined using equations [1] and [2] and are shown in Table 3. Sample IV has significantly more incorporated silicon than sample III.

Figure 14:
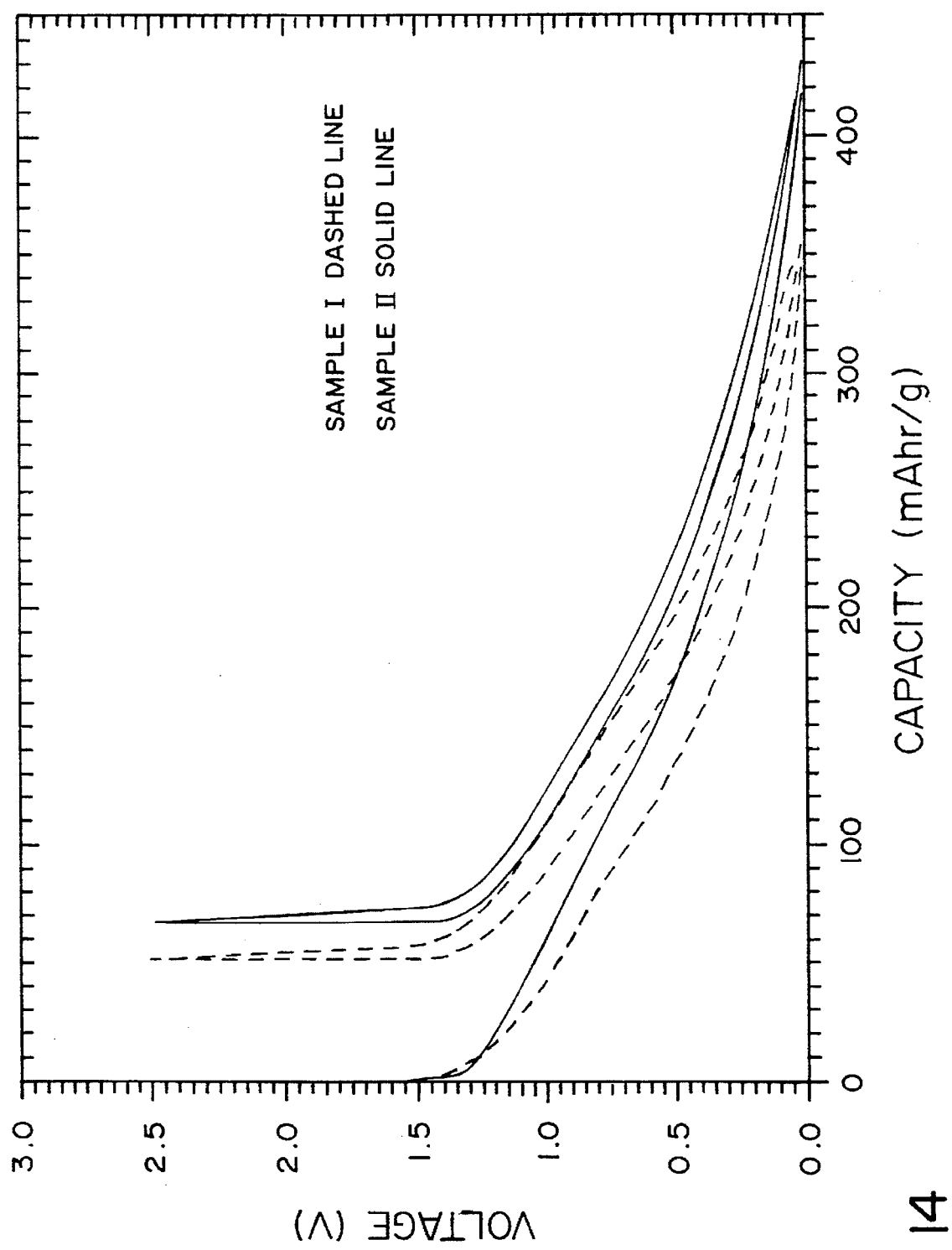
FIG. 14 compares the voltage versus capacity behaviour for the batteries comprising samples I (dashed line) and II (solid line) in Inventive Example 1.
Figure 15:
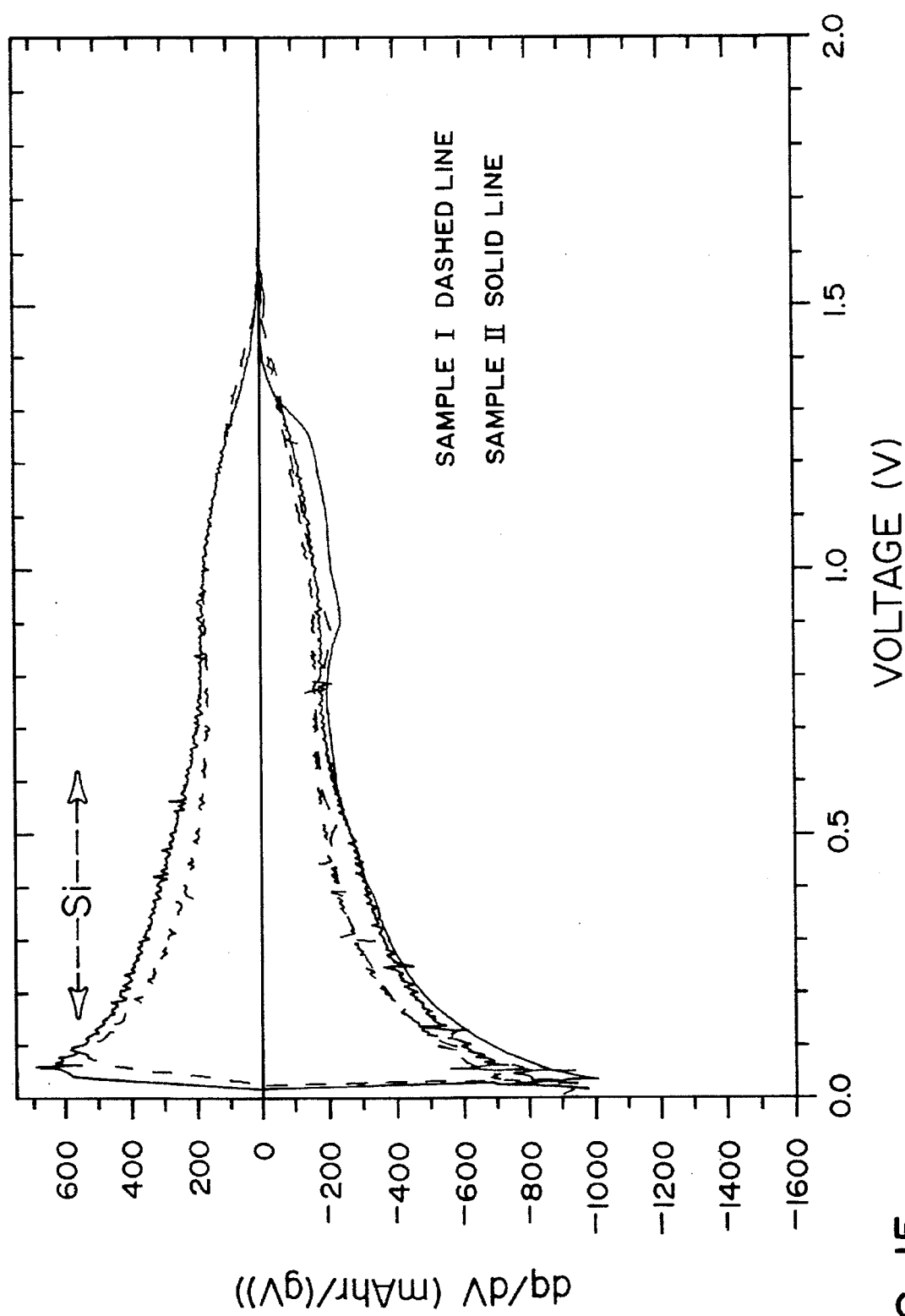
FIG. 15 compares the differential capacity for the batteries comprising samples I (dashed line) and II (solid line) in Inventive Example 1.

Finally, samples I, II, III, and IV were used as cathodes in test coin cell batteries using a lithium metal anode as described previously. Each of the batteries was cycled using currents of 7.4 mA/g for the first 3 discharges and 2 charges. Then, the discharge and charge currents respectively were increased to 74 mAh/g and 37 mAh/g for subsequent cycles. FIG. 14 compares the voltage-capacity behaviour of samples I and II, while FIG. 15 compares the differential capacity for these two samples. Sample II shows higher reversible capacity (taken as the average of the first charge and second discharge capacities) than Sample I. FIG. 15 shows that there is a small broad feature in dq/dV between about 0.15 V and 0.60 V which represents the excess capacity due to the incorporated silicon.

Figure 16:
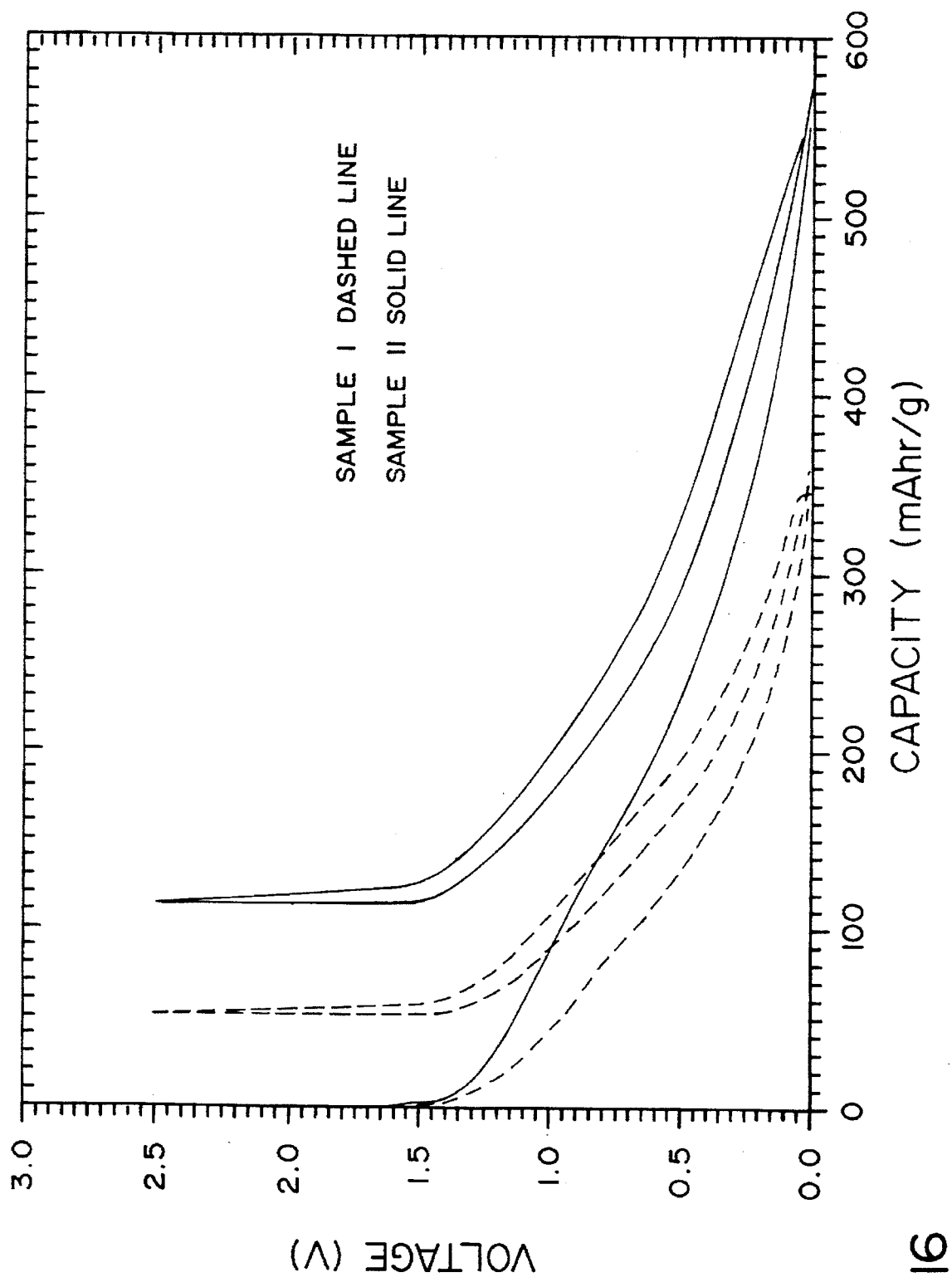
FIG. 16 compares the voltage versus capacity behaviour for the batteries comprising samples I (dashed line) and III (solid line) in Inventive Example 1.
Figure 17:
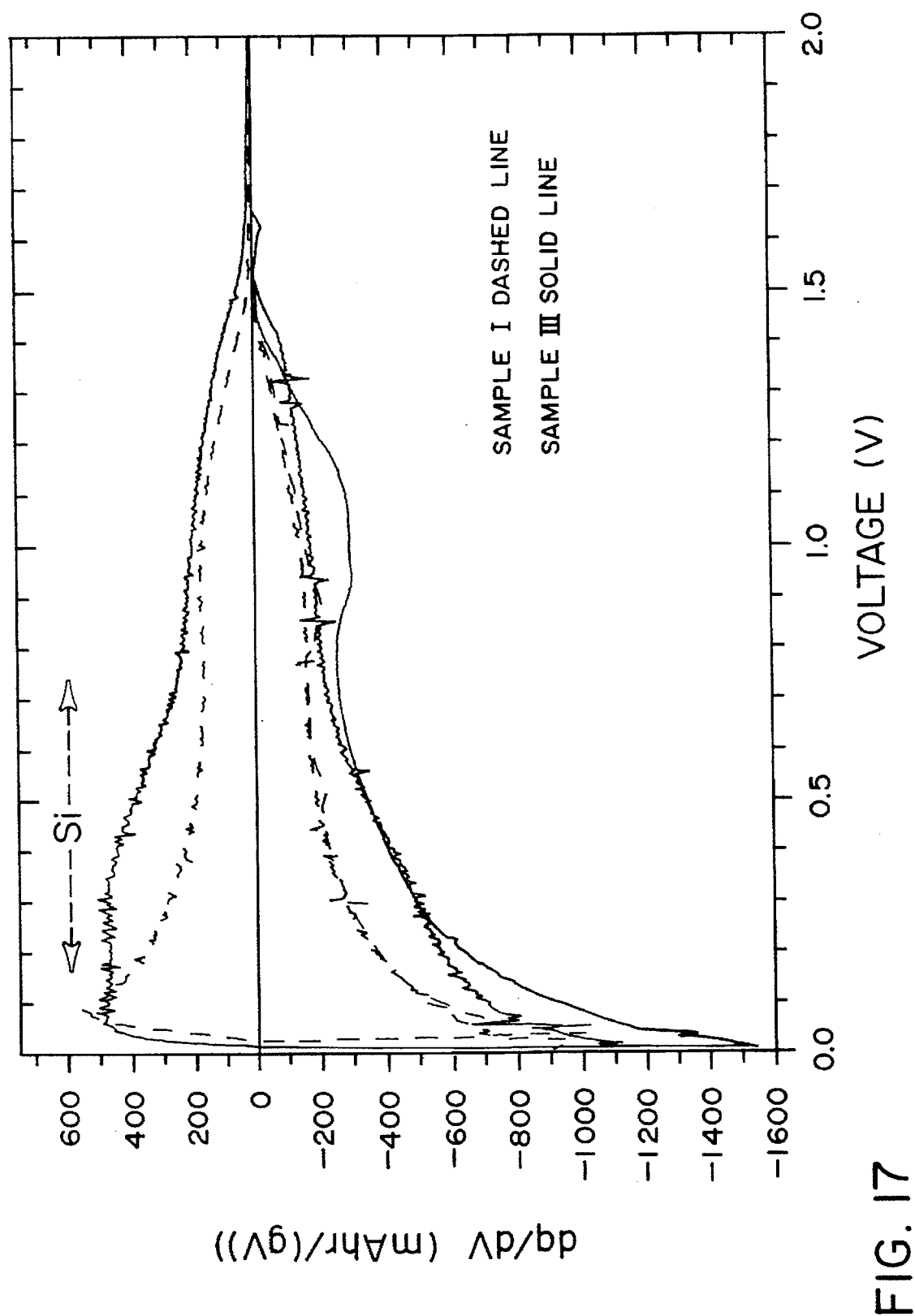
FIG. 17 compares the differential capacity for the batteries comprising samples I (dashed line) and III (solid line) in Inventive Example 1.
Figure 18:
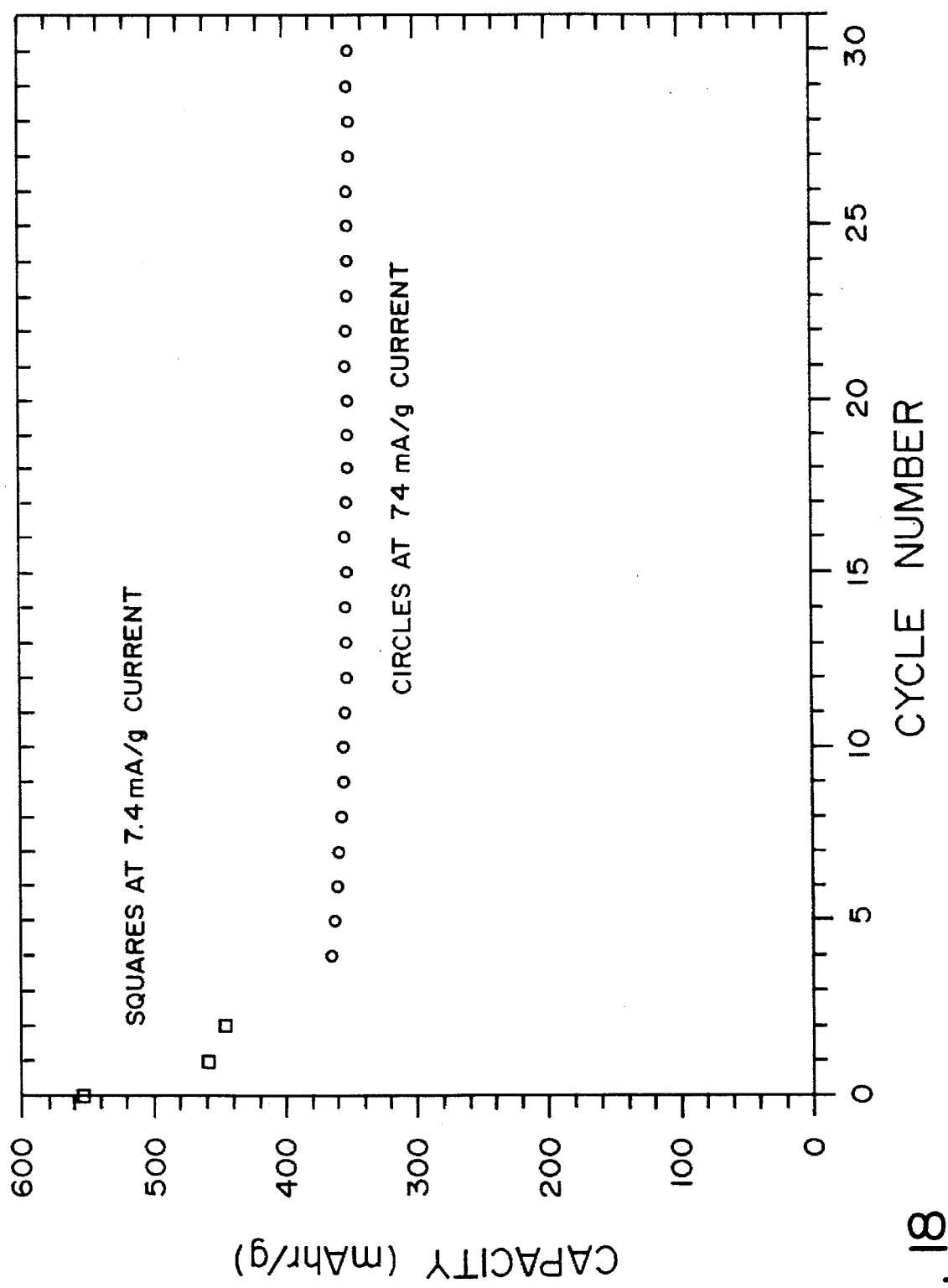
FIG. 18 shows the discharge capacity versus cycle number results for the battery comprising sample III in Inventive Example 1. The open data points were measured at a current of 7.4 mA/g and the solid points were measured at a current of 74 mA/g.

FIG. 16 compares the voltage-capacity behaviour of samples I and III. FIG. 17 shows the differential capacity for these two samples. FIG. 18 shows the discharge capacity of the battery made with sample III plotted versus cycle number. Sample III shows much larger reversible capacity than sample I and the excess capacity is mostly concentrated between 0.15 and 0.6 V as shown in FIG. 17. The high capacity is maintained over many cycles as shown in FIG. 18.

Figure 19:
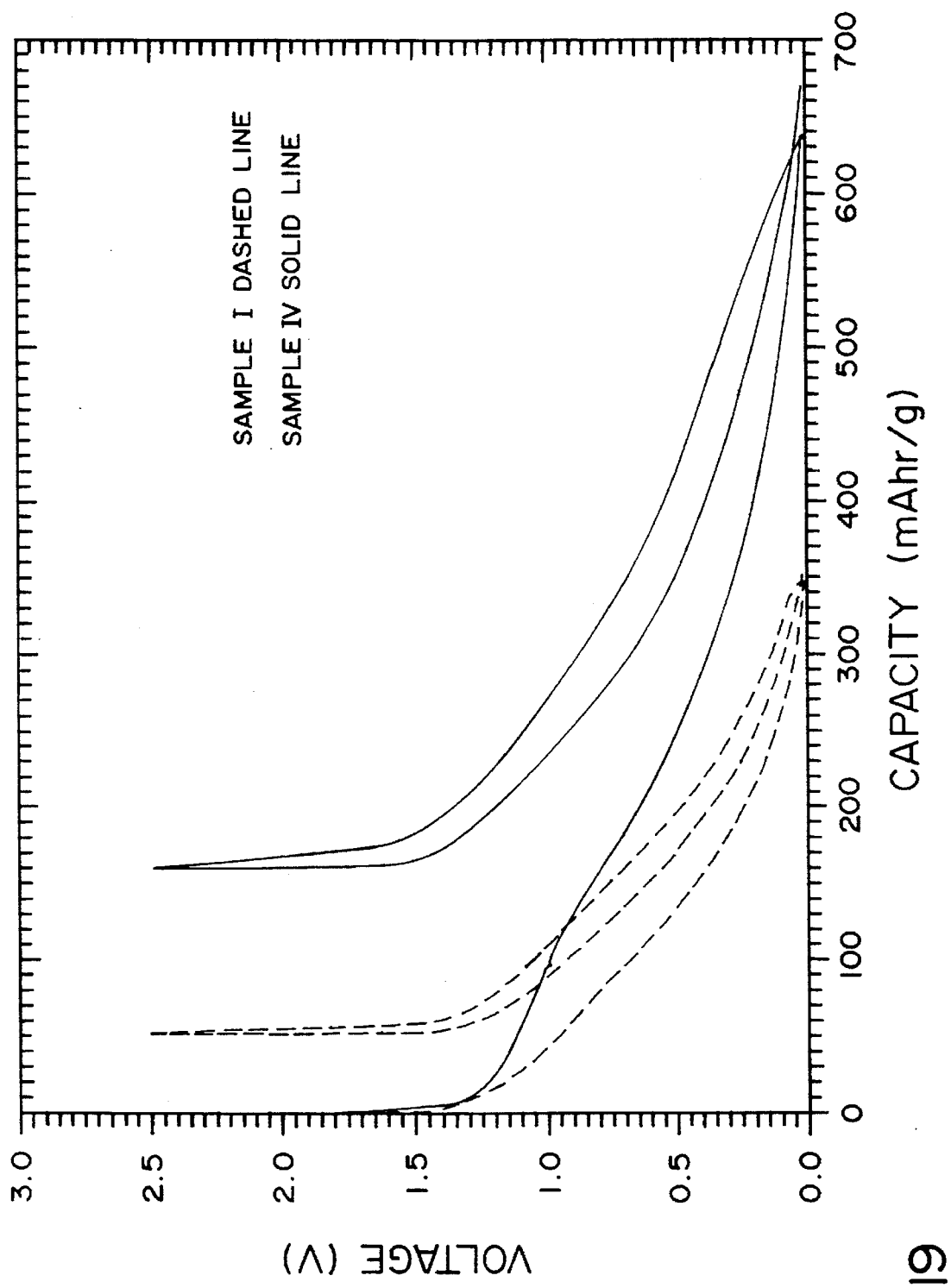
FIG. 19 compares the voltage versus capacity behaviour for the batteries comprising samples I (dashed line) and IV (solid line) in Inventive Example 1.
Figure 20:
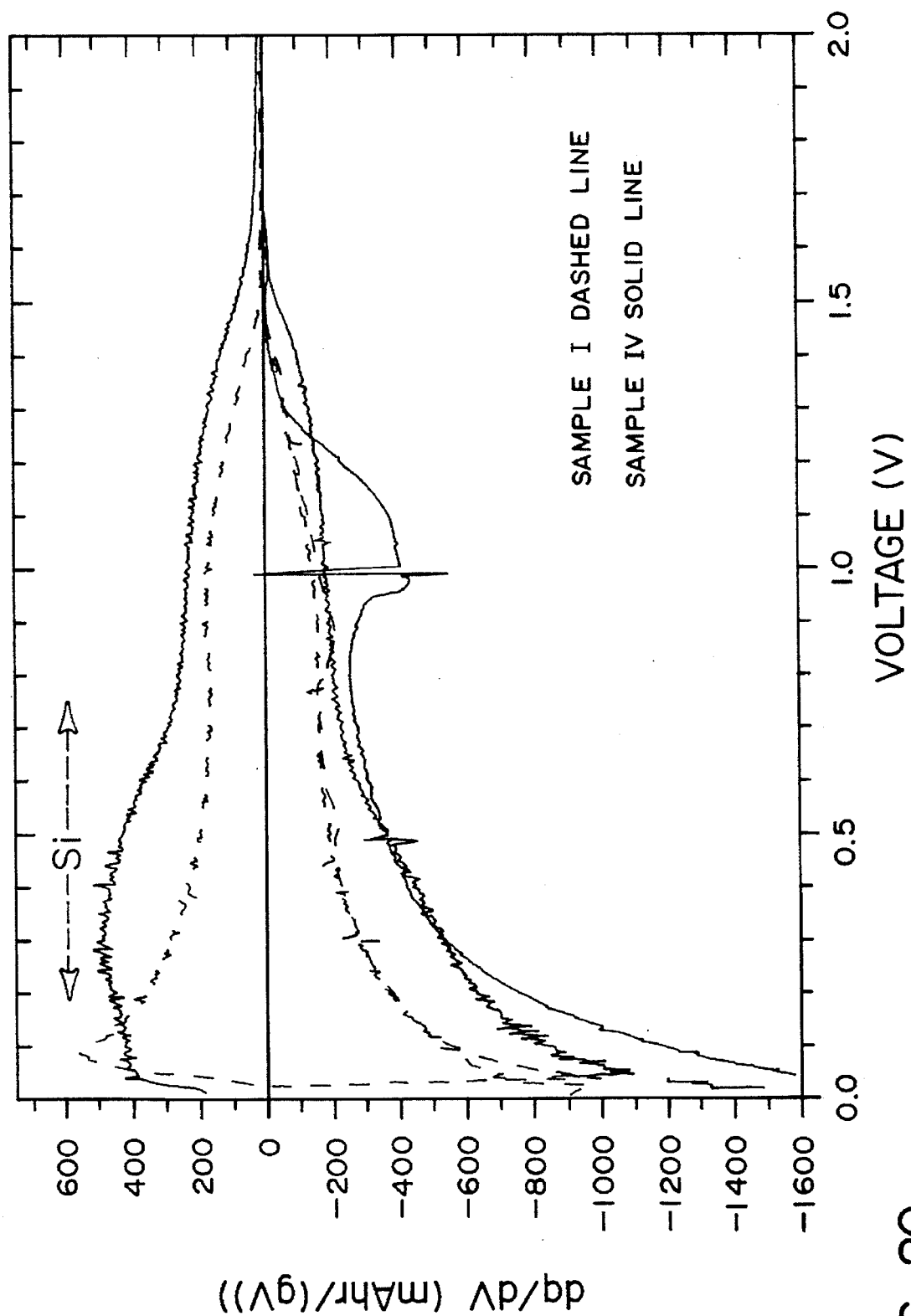
FIG. 20 compares the differential capacity for the batteries comprising samples I (dashed line) and IV (solid line) in Inventive Example 1.
Figure 21:
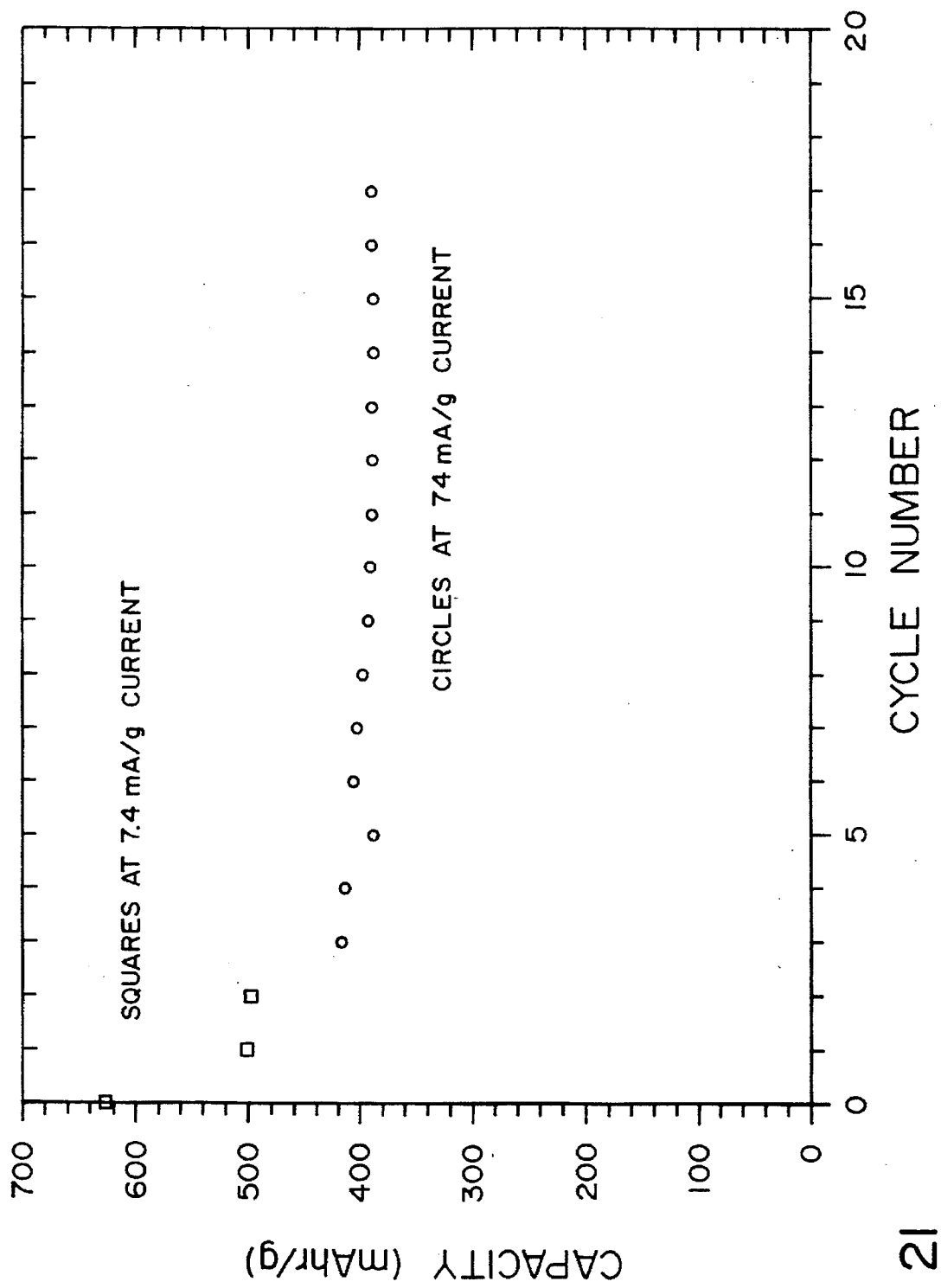
FIG. 21 shows the discharge capacity versus cycle number results for the battery comprising sample IV in Inventive Example 1. The open data points were measured at a current of 7.4 mA/g and the solid points were measured at a current of 74 mA/g.

FIG. 19 compares the voltage-capacity behaviour of samples I and IV. FIG. 20 shows the differential capacity of these two samples. FIG. 21 shows the discharge capacity of the battery made with sample IV plotted versus cycle number. Sample IV shows much larger reversible capacity than sample I and the excess capacity is mostly concentrated between 0.15 and 0.6 V as shown in FIG. 20. The high capacity is maintained over many cycles as shown in FIG. 21. The reversible capacities of samples I, II, III, and IV measured with a current of 7.4 mAh/g are also tabulated in Table 3.

This example clearly shows that silicon incorporated into a carbonaceous host similar to that of Comparative Example 1 is responsible for what can amount to a substantial increase in reversible lithium capacity. Additionally, the reversible capacity can be maintained over many cycles without significant losses.

TABLE 3

Properties of the example silicon-carbon samples

| Sample | Atomic Percent Silicon (%) | Reversible Capacity mAh/g |
|---|---|---|
| I | 0.0 | 300 |
| II | 1.6 | 360 |
| III | 5.6 | 455 |
| IV | 10.9 | 495 |

ILLUSTRATIVE EXAMPLE 1

Figure 22:
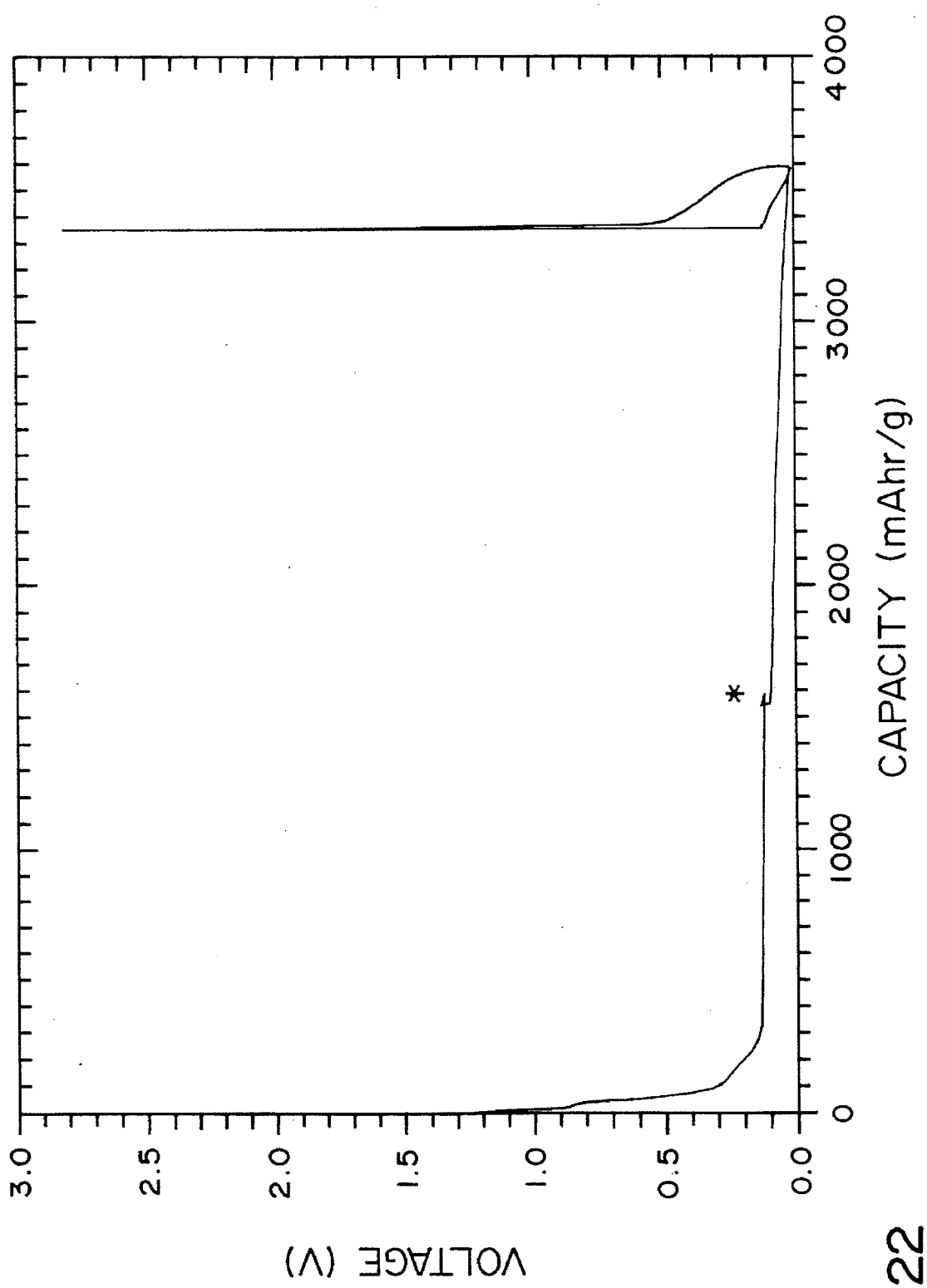
FIG. 22 shows the first discharge, first recharge, and next discharge voltage curves for the coin cell battery of Illustrative Example 2.

Cathodes for laboratory coin cell batteries were prepared using pure silicon powder, carbon black conductive dilutant, and PVDF binder as previously described. A test battery was constructed and cycled as before. FIG. 22 shows the first discharge, first recharge and next discharge of this coin cell battery. The battery attained about 3600 mAh/g of Silicon during the first discharge in good agreement with Table 1, but the reversibility is very poor as expected for alloy systems. By the fourth discharge cycle, the battery capacity had dropped below 50 mah/g.

ILLUSTRATIVE EXAMPLE 2

Cathodes for laboratory coin cell batteries were prepared using silicon carbide (SIC) powder, carbon black, and binder as described above. Electrochemical testing on these electrodes in coin cell batteries showed the silicon carbide to be electrochemically inactive.

As will be apparent to those skilled in the art in the light of the foregoing disclosure, many alterations and modifications are possible in the practice of this invention without departing from the spirit or scope thereof. For example, ternary compounds may be prepared, if desired, using the method of the invention wherein atoms of two elements B and D are incorporated into the host without substantially affecting the structure of the organized regions of said host. Accordingly, the scope of the invention is to be construed in accordance with the substance defined by the following claims.

What is claimed is:

1. A carbonaceous insertion compound comprising:
    a pre-graphitic carbonaceous host C having organized and disorganized structural regions; and
    atoms of an element B selected from the group consisting of Sn, Al, Si, Cd, Pb, Bi and Sb, incorporated into, and compatible with, the host C wherein the structure of the organized regions of the host C is substantially unaffected by said incorporation.

2. A carbonaceous insertion compound as claimed in claim 1 wherein the atoms of element B are incorporated predominantly into the disorganized regions of the host.

3. A carbonaceous insertion compound as claimed in claim 2 wherein the atoms of element B are incorporated predominantly as monodispersed atoms in the disorganized regions of the host.

4. A carbonaceous insertion compound as claimed in claim 3 wherein the incorporation is characterized by a substantial shift in position of the x-ray absorption edge for the incorporated atoms of element B with respect to the position of the x-ray absorption edge for atoms in a pure compound of element B.

5. A carbonaceous insertion compound as claimed in claim 1 having the formula $B_yC_{1-y}$ wherein y is a number greater than zero and less than about 0.2.

6. A carbonaceous insertion compound as claimed in claim 5 having structural parameters a, $d_{002}$, $L_a$, and $L_c$ wherein a is greater than about 2.44Å and less than about 2.46Å, $d_{002}$ is greater than about 3.47Å and less than about 3.51Å, $L_a$ is greater than about 10Å and less than about 20Å, and $L_c$ is greater than about 10Å and less than about 30Å.

7. A carbonaceous insertion compound as claimed in claim 1 wherein B is Si.

8. A carbonaceous insertion compound comprising:
    a pre-graphitic carbonaceous host C having organized and disorganized structural regions;
    atoms of an alkali metal A inserted into the host C, the amount of metal A being in a range from greater than or equal to zero; and
    atoms of an element B selected from the group consisting of Sn, Al, Si, Cd, Pb, Bi and Sb, incorporated into and compatible with the host C, the amount of element B being greater than zero, wherein element B is capable of forming alloys with metal A and the structure of the organized regions of the host C is substantially unaffected by said incorporation.

9. A carbonaceous insertion compound as claimed in claim 8 wherein element B is Si.

10. A carbonaceous insertion compound as claimed in claim 8 wherein metal A is Li.

11. A carbonaceous insertion compound as claimed in claim 9 wherein metal A is Li, the compound has a formula $Li_xSi_yC_{1-y}$, and y is less than about 0.11.

12. A carbonaceous insertion compound comprising a pre-graphitic carbonaceous host C having organized and disorganized structural regions; atoms of an alkali metal A inserted into the host C, the amount of metal A being in the range from greater than or equal to zero; and atoms of Si incorporated into and compatible with the host C, the amount of Si being greater than zero, wherein Si is capable of forming alloys with metal A and the structure of the organized regions of the host C is substantially unaffected by said incorporation wherein the midpoint of the silicon L x-ray absorption edge for the incorporated atoms if Si is at about 104 eV.

13. A carbonaceous insertion compound as claimed in claim 12 having structural parameters a, $d_{002}$, $L_a$, and $L_c$ wherein a is greater than about 2.44Å and less than about 2.46Å, $d_{002}$ is greater than about 3.47Å and less than about 3.51Å, $L_a$ is greater than about 10Å and less than about 20Å, and $L_c$ is greater than about 10Å and less than about 30Å.

17

14. A carbonaceous insertion compound as claimed in claim 8 wherein the metal A is Li, the element B is Si, the compound has a formula $Li_xSi_yC_{1-y}$, and y is less than about 0.11 and the reversible range of x is increased at voltages between about 0.15 V and about 0.6 V with respect to lithium metal by said incorporation.

15. A process for making a carbonaceous insertion compound comprising: a pre-graphitic carbonaceous host C having organized and disorganized structural regions; and atoms of an element B incorporated into, and compatible with, the host C wherein the structure of the organized regions of the host C is substantially unaffected by said incorporation, by chemical vapor deposition involving reacting a gas phase source for host C and a gas phase source for element B and depositing said compound as a reaction product.

16. A process for making a carbonaceous insertion compound as claimed in claim 15 wherein the reacting is performed at a temperature between about 200° C. and about 1100° C.

17. A process for making a carbonaceous insertion compound as claimed in claim 15 wherein the gas phase source for host C is benzene.

18. A process for making a carbonaceous insertion compound as claimed in claim 15 wherein element B is Si by chemical vapor deposition involving reacting a gas phase source for host C and a gas phase source for Si and depositing said compound as a reaction product.

19. A process for making a carbonaceous insertion compound as claimed in claim 18 wherein the reacting is performed at a temperature between about 200° C. and about 1100° C.

20. A process for making a carbonaceous insertion compound as claimed in claim 18 wherein the gas phase source for Si is $SiCl_4$ or $Si(CH_3)_2Cl_2$.

21. A process for making a carbonaceous insertion compound comprising: a pre-graphitic carbonaceous host C having organized and disorganized structural regions; and atoms of an element B incorporated into, and compatible with, the host C wherein the structure of the organized regions of the host C is substantially unaffected by said incorporation, by polymer blending wherein a polymer source for host C and a polymer source for element B are reacted together at elevated temperature.

22. A process for making a carbonaceous insertion compound comprising a pre-graphitic carbonaceous host C having organized and disorganized structural regions; atoms of an alkali metal A inserted into the host C, the amount of metal A being in a range from greater than or equal to zero; and atoms of an element B incorporated into and compatible with the host C, the amount of element B being greater than zero, wherein element B is capable of forming alloys with metal A and the structure of the organized regions of the host C is substantially unaffected by said incorporation by chemical vapor deposition involving reacting a gas phase source for host C and a gas phase source for element B and depositing said insertion compound as a reaction product.

23. A process for making a carbonaceous insertion compound as claimed in claim 22 wherein the reaction is performed at a temperature between about 200° C. and about 1100° C.

24. A process for making a carbonaceous insertion compound as claimed in claim 22 wherein the gas phase source for host C is benzene.

25. A process for making a carbonaceous insertion compound as claimed in claim 22 wherein element B is Si and the gas phase source for Si is $SiCl_4$ or $Si(CH_3)_2Cl_2$.

26. An electrochemical device comprising an electrode wherein a portion of the electrode comprises the carbonaceous insertion compound as claimed in claims 1, 8, 11, 12, 13, or 14.

27. A battery comprising an electrode wherein a portion of the electrode comprises the carbonaceous insertion compound as claimed in claims 1, 8, 11, 12, 13, or 14.

28. A non-aqueous battery comprising:

a cathode comprising a lithium insertion compound;

a non-aqueous electrolyte comprising a lithium salt dissolved in a mixture of non-aqueous solvents; and an anode comprising the carbonaceous insertion compound as claimed in claims 1, 10, 11, 12, 13 or 14.

29. A process for making a carbonaceous insertion compound as claimed in claim 22 wherein element B is selected from the group consisting of Sn, Al, Si, Cd, Pb, Bi and Sb.

30. A carbonaceous insertion compound as claimed in claim 12 wherein metal A is Li.

31. A carbonaceous insertion compound as claimed in claim 12 wherein metal A is Li, the compound has a formula $Li_xSi_yC_{1-y}$, and y is less than about 0.11.

* * * * *

UNITED STATES PATENT AND TRADEMARK OFFICE
CERTIFICATE OF CORRECTION

PATENT NO. : 5,624,606
DATED : April 29, 1997
INVENTOR(S) : Wilson et al.

It is certified that error appears in the above-identified patent and that said Letters Patent is hereby corrected as shown below:

Column 1, line 39, "surface" should read --suffice--.

Column 1, line 45, "nose" should read --host--.

Column 8, line 45, "hisphenol" should read --bisphenol--.

Column 8, line 54, "the-epoxy" should read --the epoxy--.

Columns 13-14, within Table 2, in the first line of the heading of column 8, "Lc" should read --La--.

Column 15, line 45, "mah/g" should read --mAh/g--.

Column 15, line 49, "(SIC)" should read --(SiC)--.

Signed and Sealed this

First Day of July, 1997

*Attest:*

*Attesting Officer*

BRUCE LEHMAN

*Commissioner of Patents and Trademarks*